(12) United States Patent
Obinata

(10) Patent No.: US 8,233,003 B2
(45) Date of Patent: Jul. 31, 2012

(54) IMAGE PROCESSING DEVICE, IMAGE PROCESSING METHOD, AND ELECTRONIC INSTRUMENT

(75) Inventor: Atsushi Obinata, Hachioji (JP)

(73) Assignee: Seiko Epson Corporation (JP)

( * ) Notice: Subject to any disclaimer, the term of this patent is extended or adjusted under 35 U.S.C. 154(b) by 539 days.

(21) Appl. No.: 12/075,428

(22) Filed: Mar. 11, 2008

(65) Prior Publication Data

US 2008/0225053 A1    Sep. 18, 2008

(30) Foreign Application Priority Data

Mar. 12, 2007   (JP) ................................. 2007-061674
Dec. 19, 2007   (JP) ................................. 2007-327198

(51) Int. Cl.
*G06T 9/00* (2006.01)
*G06F 12/06* (2006.01)
*G09G 5/00* (2006.01)
*G06K 9/36* (2006.01)

(52) U.S. Cl. ........ 345/555; 345/571; 345/649; 345/658; 382/232

(58) Field of Classification Search .................. 345/555, 345/560, 649–659; 382/232, 296–297
See application file for complete search history.

(56) References Cited

U.S. PATENT DOCUMENTS

| | | | | |
|---|---|---|---|---|
| 3,681,763 A | * | 8/1972 | Meade et al. ............ | 365/189.15 |
| 5,081,700 A | * | 1/1992 | Crozier ......................... | 345/658 |
| 5,239,388 A | * | 8/1993 | Matsumoto ................... | 358/448 |
| 5,577,182 A | * | 11/1996 | Hayashi ......................... | 345/657 |
| 7,570,819 B2 | * | 8/2009 | Sung et al. ..................... | 382/232 |
| 7,636,497 B1 | * | 12/2009 | Chambers ..................... | 382/277 |
| 2005/0270308 A1 | * | 12/2005 | Obinata ......................... | 345/619 |
| 2006/0133695 A1 | | 6/2006 | Obinata | |

FOREIGN PATENT DOCUMENTS

| | | |
|---|---|---|
| JP | 1-112377 | 5/1989 |
| JP | 07-320052 | 12/1995 |
| JP | 08-241404 | 9/1996 |
| JP | 09-252399 | 9/1997 |
| JP | 2001-257888 | 9/2001 |
| JP | 2004-328571 | 11/2004 |
| JP | 2006-174334 | 6/2006 |
| WO | 2005-059836 | 6/2005 |
| WO | 2007-021615 | 2/2007 |

* cited by examiner

*Primary Examiner* — Kee M Tung
*Assistant Examiner* — Sing-Wai Wu
(74) *Attorney, Agent, or Firm* — Harness, Dickey & Pierce, P.L.C.

(57) ABSTRACT

An image processing device that supplies image data to a driver section of a display panel includes an encoding section that encodes image data on a block-by-block basis to generate encoded data, the image data corresponding to one scan line of an input image, the image data being divided into a plurality of blocks, a memory that stores the encoded data from the encoding section, and a decoding section that decodes the encoded data from the memory on a block-by-block basis to generate decoded data, the decoded data from the decoding section being supplied to the driver section.

16 Claims, 22 Drawing Sheets

FIG. 14A

| INPUT VALUE (9 BITS) | OUTPUT VALUE (4 BITS) |
|---|---|
| −255 | 0 |
| −254 | 0 |
| −253 | 0 |
| −252 | 0 |
| −251 | 0 |
| −250 | 0 |
| −249 | 1 |
| ⋮ | ⋮ |
| −1 | 9 |
| ⋮ | ⋮ |
| 250 | 14 |
| 251 | 14 |
| 252 | 14 |
| 253 | 14 |
| 254 | 14 |
| 255 | 14 |

FIG. 14B

| INPUT VALUE (4 BITS) | OUTPUT VALUE (9 BITS) |
|---|---|
| 0 | −255 |
| 0 | −254 |
| 0 | −253 |
| 0 | −252 |
| 0 | −251 |
| 0 | −250 |
| 1 | −249 |
| ⋮ | ⋮ |
| 9 | −1 |
| ⋮ | ⋮ |
| 14 | 250 |
| 14 | 251 |
| 14 | 252 |
| 14 | 253 |
| 14 | 254 |
| 14 | 255 |

IMAGE PROCESSING DEVICE, IMAGE PROCESSING METHOD, AND ELECTRONIC INSTRUMENT

Japanese Patent Application No. 2007-61674 filed on Mar. 12, 2007 and Japanese Patent Application No. 2007-327198 filed on Dec. 19, 2007, are hereby incorporated by reference in their entirety.

BACKGROUND OF THE INVENTION

The present invention relates to an image processing device, an image processing method, an electronic instrument, and the like.

For example, the number of pixels and the number of grayscales per pixel of a liquid crystal display device of a portable telephone have been increased in order to display a high-definition image. A VGA mode (480×640 dots) or a WVGA mode (480×800 dots) is expected to be employed for the screen of a portable telephone instead of a QVGA mode (240×320 dots). The grayscale value per pixel is 16 or 18 bits in the QVGA mode. The grayscale value per pixel (definition) is increased to 18 or 24 bits in the VGA or WVGA mode. An increase in the number of pixels and the grayscale value requires an increase in capacity of a memory which stores image data.

An increase in capacity of a memory significantly increases the cost of a driver IC including a RAM. For example, the memory area of a RAM increases by four when employing the QVGA mode instead of the VGA mode, whereby the area of a driver IC (driver section in a broad sense) including a RAM increases to a large extent. In this case, a driver IC including a RAM which is mounted on a glass substrate using a chip on grass (COG) technology increases the area of a glass substrate of a liquid crystal display panel, whereby the number of panels produced from a production substrate decreases. Moreover, the rectangular shape of a known driver IC of which the longitudinal axis coincides with the short side of the glass substrate cannot be maintained. This makes it difficult to employ the COG mounting technology. Therefore, it is necessary to use a chip on film (COF) mounting technology.

Some portable telephones employ a configuration in which a liquid crystal control IC is provided between a baseband engine and a liquid crystal driver IC in order to reduce the task of the baseband engine relating to liquid crystal display instead of a configuration in which a baseband engine (LSI) directly supplies image data to a liquid crystal driver IC. However, the capacity of a memory provided in the liquid crystal control IC must be increased as the amount of image data increases.

The above problem also occurs when transferring high-definition image data between an integrated circuit (image output source) which receives or generates and image and an integrated circuit which drives a display section or a printer.

In recent years, an image captured using a camera provided in a portable telephone may be displayed on a liquid crystal display device, or an image distributed by digital terrestrial broadcasting may be displayed on a liquid crystal display device. In this case, when displaying an image captured using a camera or an image distributed by broadcasting on a liquid crystal display device, it is necessary to rotate the image by a given angle (e.g., 90°, 180°, or 270°).

However, it is difficult to extract only data of pixels in a specific area after compression using technologies disclosed in JP-A-1-112377 and JP-A-2001-257888. When rotating an image, since the image data of the image after the rotation process is stored in a memory, a work area is necessary for the rotation process. According to the technologies disclosed in JP-A-1-112377 and JP-A-2001-257888, it is necessary to provide a memory which stores data of pixels of at least one screen. Therefore, the capacity of the memory must be increased.

SUMMARY

According to one aspect of the invention, there is provided an image processing device that supplies image data to a driver section of a display panel, the image processing device comprising:

an encoding section that encodes image data on a block-by-block basis to generate encoded data, the image data corresponding to one scan line of an input image, the image data being divided into a plurality of blocks;

a memory that stores the encoded data from the encoding section; and a decoding section that decodes the encoded data from the memory on a block-by-block basis to generate decoded data, the decoded data from the decoding section being supplied to the driver section.

According to another aspect of the invention, there is provided an image processing method that supplies image data to a driver section of a display panel, the image processing method comprising:

encoding image data on a block-by-block basis to generate encoded data, the image data corresponding to one scan line of an input image, the image data being divided into a plurality of blocks;

storing the encoded data in a memory;

decoding the encoded data from the memory on a block-by-block basis to generate decoded data; and supplying the decoded data to the driver section.

According to another aspect of the invention, there is provided an electronic instrument comprising:

the above image processing device;

a driver section, image data being supplied to the driver section from the image processing device; and a display panel that is driven by the driver section.

BRIEF DESCRIPTION OF THE SEVERAL VIEWS OF THE DRAWING

FIG. 14A is a view illustrative of a quantization table shown in FIG. 13, and

FIG. 14B is a view illustrative of an inverse quantization table shown in FIG. 13.

DETAILED DESCRIPTION OF THE EMBODIMENT

Figure 1:
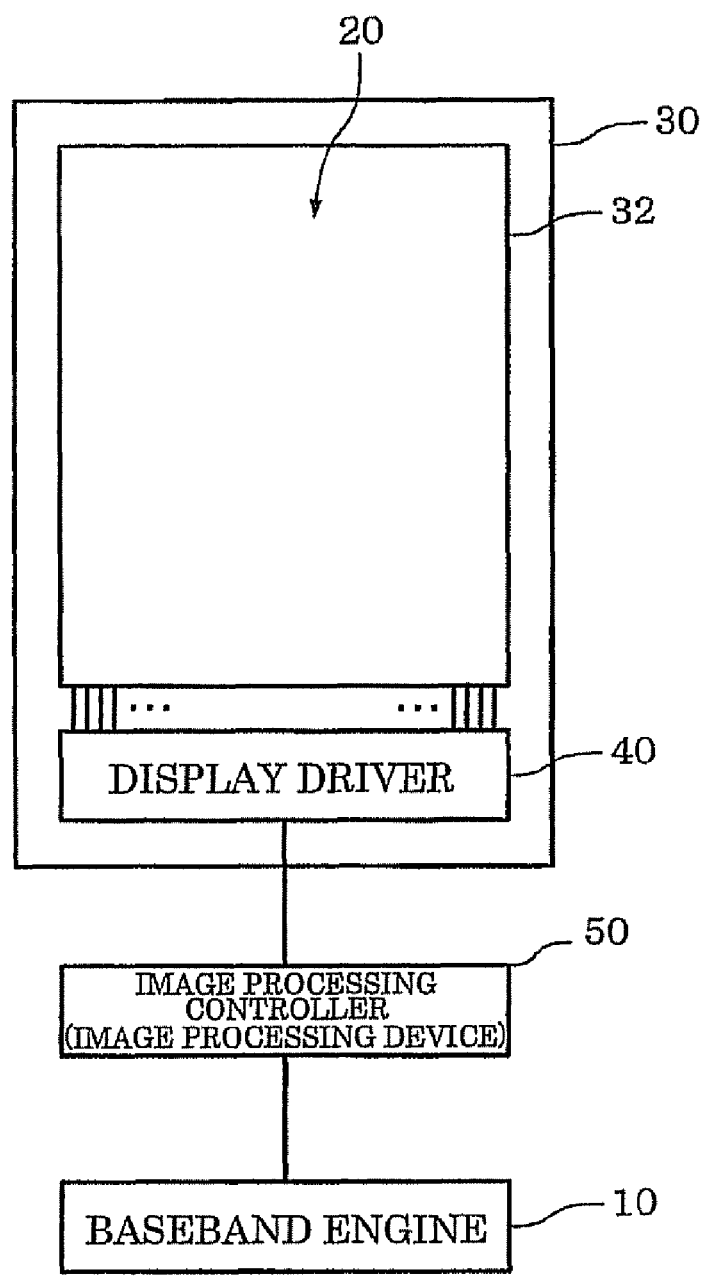
FIG. 1 is a view schematically showing the configuration of a liquid crystal display device to which an image processing device according to one embodiment of the invention is applied.

Some aspects of the invention may provide an image processing device which can be reduced in size by reducing the memory capacity even if the amount of image data increases, an image processing method, and an electronic instrument.

Further aspects of the invention may provide an image processing device which allows the memory capacity to be reduced even when rotating an image, an image processing method, and an electronic instrument.

According to one embodiment of the invention, there is provided an image processing device that supplies image data to a driver section of a display panel, the image processing device comprising:

an encoding section that encodes image data on a block-by-block basis to generate encoded data, the image data corresponding to one scan line of an input image, the image data being divided into a plurality of blocks;

a memory that stores the encoded data from the encoding section; and a decoding section that decodes the encoded data from the memory on a block-by-block basis to generate decoded data, the decoded data from the decoding section being supplied to the driver section.

In the image processing device according to this embodiment, the image processing device may further comprise a write address generation circuit that generates a write address that specifies a write area of the memory, data in the write area specified by the write address may be updated by a part of the encoded data corresponding to a block among the plurality of blocks.

In the image processing device according to this embodiment, the image processing device may further include a read address generation circuit that generates a read address that specifies a read area of the memory, a part of the encoded data corresponding to a block among the plurality of blocks may be read from the read area specified by the read address.

According to this embodiment, the image data is encoded on a block-by-block basis, into which one scan line is divided, and stored it in the memory. The data read from the memory is decoded and supplied to the driver section. Therefore, an inexpensive image processing device of which the memory capacity is reduced can be provided. The compression rate decreases as compared with the case of encoding the image data of one scan line. On the other hand, the encoding process and the decoding process are completed in block units. Specifically, even if data in one block is replaced by another piece of data, the decoding results for other blocks are not affected. Therefore, data stored in a memory in an encoded state can be written (updated) or read in block units, whereby a user-friendly image processing controller can be provided.

In the image processing device according to this embodiment, the image processing device may further comprise a rotation processing section that performs a rotation process, the rotation process generating an image by rotating the input image by a given angle with respect to a vertical direction of the input image, the rotation processing section may include one or a plurality of line buffers, each of the one or a plurality of line buffers storing image data of one scan line of the input image; and image data of the image that has been generated by the rotation process performed by the rotation processing section may be supplied to the encoding section.

According to this embodiment, since the image data is encoded in block units, the image data after the rotation process can be stored in the memory with a very small memory capacity.

In the image processing device according to this embodiment, when a capacity of each of the one or a plurality of line buffers is LB bits, the number of pixels of one scan line of the input image is H, and the number of bits of one pixel of the input image is P, a data length of each of the plurality of blocks may be a value equal to or less than f(LB/H/P) (where the function f indicates a function omitting a decimal point and a decimal place).

According to this embodiment, since the image data is compressed while effectively utilizing the capacity of the line buffer to a maximum extent, the capacity of the line buffer of the rotation processing section can be minimized.

In the image processing device according to this embodiment, when the encoding section encodes the image data of the input image at a compression rate equal to or higher than a given compression rate W, a bit width that is an access unit of the memory is B, and the number of bits of one pixel of the input image is P, a data length of each of the plurality of blocks may be a value equal to or less than f(B/W/P) (where the function f indicates a function omitting a decimal point and a decimal place).

According to this embodiment, since the number of accesses to the memory can be reduced, the compression process can be performed quickly even if the screen size increases, whereby an increase in capacity of the memory can be suppressed.

In the image processing device according to this embodiment, a data length of each of the plurality of blocks may be caused to differ depending on a format of the image data of the input image.

According to this embodiment, an image processing device can be provided which can be reduced in size by reducing the memory capacity irrespective of the image format.

According to another embodiment of the invention, there is provided an image processing method that supplies image data to a driver section of a display panel, the image processing method comprising:

encoding image data on a block-by-block basis to generate encoded data, the image data corresponding to one scan line of an input image, the image data being divided into a plurality of blocks;

storing the encoded data in a memory;

decoding the encoded data from the memory on a block-by-block basis to generate decoded data; and supplying the decoded data to the driver section.

In the image processing method according to this embodiment, the image processing method may further comprise:

generating a write address that specifies a write area of the memory; and updating data in the write area specified by the write address by a part of the encoded data corresponding to a block among the plurality of blocks.

In the image processing method according to this embodiment, the image processing method may further comprise:

generating a read address that specifies a read area of the memory; and reading a part of the encoded data corresponding to a block among the plurality of blocks from the read area specified by the read address.

In the image processing method according to this embodiment, the image processing method may further comprise:

performing a rotation process using one or a plurality of line buffers, each of the one or a plurality of line buffers storing image data of one scan line of the input image, the rotation process generating an image by rotating the input image by a given angle with respect to a vertical direction of the input image; and encoding image data of the image that has been generated by the rotation process.

In the image processing method according to this embodiment, when a capacity of each of the one or a plurality of line buffers is LB bits, the number of pixels of one scan line of the input image is H, and the number of bits of one pixel of the input image is P, a data length of each of the plurality of blocks may be a value equal to or less than f(LB/H/P) (where the function f indicates a function omitting a decimal point and a decimal place).

In the image processing method according to this embodiment, when the encoding section encodes the image data of the input image at a compression rate equal to or higher than a given compression rate W, a bit width that is an access unit of the memory is B, and the number of bits of one pixel of the input image is P, a data length of each of the plurality of blocks may be a value equal to or less than f(B/W/P) (where the function f indicates a function omitting a decimal point and a decimal place).

In the image processing method according to this embodiment, the image processing method may further comprise causing a data length of each of the plurality of blocks to differ depending on a format of the image data of the input image.

According to this embodiment, an image processing method can be provided which can achieve a reduction in size by reducing the memory capacity even if the amount image data increases. According to this embodiment, an image processing method which can reduce the memory capacity even when rotating an image can be provided.

According to another embodiment of the invention, there is provided an electronic instrument comprising:

one of the above image processing devices;

a driver section, image data being supplied to the driver section from the image processing device; and a display panel that is driven by the driver section.

According to this embodiment, an electronic instrument can be provided to which an image processing device which can be reduced in size by reducing the memory capacity even if the amount image data increases is applied. According to this embodiment, an electronic instrument can be provided to which an image processing device which allows the memory capacity to be reduced even when rotating an image is applied.

Embodiments of the invention are described in detail below with reference to the drawings. Note that the embodiments described below do not in any way limit the scope of the invention laid out in the claims. Note that all elements of the embodiments described below should not necessarily be taken as essential requirements for the invention.

1. Liquid Crystal Display device

FIG. 1 shows a configuration example when applying one embodiment of the invention to a portable telephone.

In FIG. 1, a baseband engine 10 (BBE: image supply device in a broad sense) is a large scale integrated circuit (LSI) which includes a central processing unit (CPU) which controls the basic functions of the portable telephone. The baseband engine 10 outputs various types of image data such as a motion picture and a still picture received via the Internet, a picture photographed using a camera, and character and graphic information such as a menu screen and an icon required for operating the portable telephone.

In FIG. 1, a liquid crystal display panel (display panel in a broad sense) 20 is provided as a display of the portable telephone. The liquid crystal display panel 20 is formed by sealing a liquid crystal between two glass substrates 30 and 32. The glass substrate 30 (larger substrate) is an active matrix substrate, for example. A thin film transistor (TFT) which is an active element is provided in each pixel. A transparent pixel electrode is connected to a drain terminal of the TFT of each pixel, a source line (data line) is connected to a source terminal of the TFT, and a gate line (scan line) is connected to a gate terminal of the TFT. A transparent electrode is provided on the glass substrate 30 opposite to the glass substrate 32. A display driver (driver section in a broad sense) 40 which drives the liquid crystal display panel 20 is mounted on the glass substrate 32 by means of COG technology along the short side of the glass substrate 30. The display driver 40 drives the liquid crystal display panel 20 by supplying a scan signal to the gate line of the liquid crystal display panel 20 and supplying a data signal to the source line of the liquid crystal display panel 20.

An image processing controller (image processing device in a broad sense) 50 is provided between the baseband engine 10 and the display driver 40. A plurality of bus lines are provided between the baseband engine 10 and the image processing controller 50 and between the image processing controller 50 and the display driver 40. Image data, a horizontal/vertical synchronization signal, a clock signal, and various commands are transferred through the bus lines.

In this embodiment, the image processing controller 50 stores the image data from the baseband engine 10, performs image processing such as a rotation process or an overlay process, and supplies the processed image data to the display driver 40. The image processing controller 50 includes a memory as compressed image data memory. The image processing controller 50 compresses (encodes) the image data from the baseband engine 10, and stores the compressed image data in the memory. The image processing controller 50 decompresses (decodes) the compressed image data stored in the memory, and outputs the resulting image data to the display driver 40. This enables the capacity of the memory to be reduced.

2. Image Processing Controller

Figure 2:
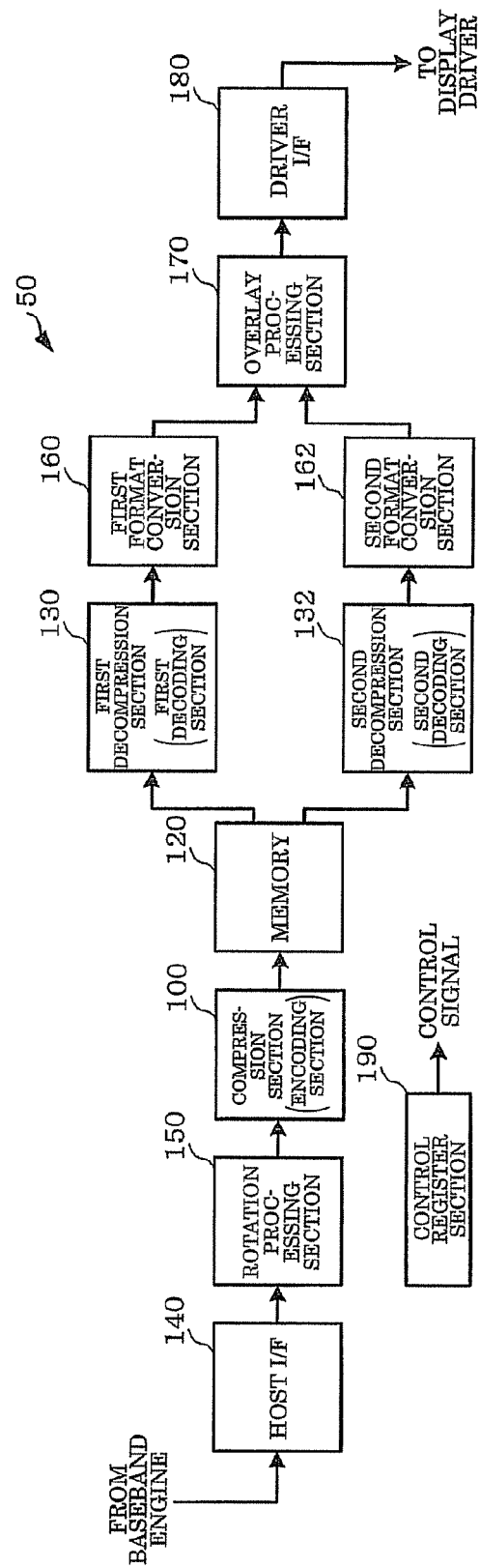
FIG. 2 is a block diagram showing a configuration example of an image processing controller shown in FIG. 1.

FIG. 2 is a block diagram showing a configuration example of the image processing controller 50 shown in FIG. 1.

Note that this embodiment is not limited to the configuration shown in FIG. 2. A configuration may be employed in which at least one circuit block of the circuit blocks shown in FIG. 2 is omitted.

The image processing controller 50 includes a compression section 100 as an encoding section, a memory 120 as a compressed image data memory, and first and second decompression sections (first and second decoding sections) 130 and 132 as decoding sections. Although FIG. 2 shown an example in which the first and second decompression sections 130 and 132 are provided, only one of the first and second decompression sections 130 and 132 may be provided.

The baseband engine 10 encodes the image data (image data of input image) from the baseband engine 10 on a block-by-block basis, and the image data of one scan line (one horizontal scan) is divided into a plurality of blocks. Specifically, the compression section 100 ensures that the image data of one screen (one frame) is encoded by compressing the image data at a compression rate equal to or higher than a given compression rate (e.g. 50%). It is desirable that the compression section 100 ensure the data size of the image data of one screen after compression by encoding the image data of one scan line by compressing the image data at a compression rate equal to or higher than a given compression rate. When compressing the image data at a compression rate equal to or higher than a given compression rate of 50%, the data size after compression is reduced by 50% as compared with the data size before compression. The expression "ensures the data size" means that the process is performed so that the maximum data size after compression is equal to or less than the data size when encoding the image data at the given compression rate.

Figure 3:
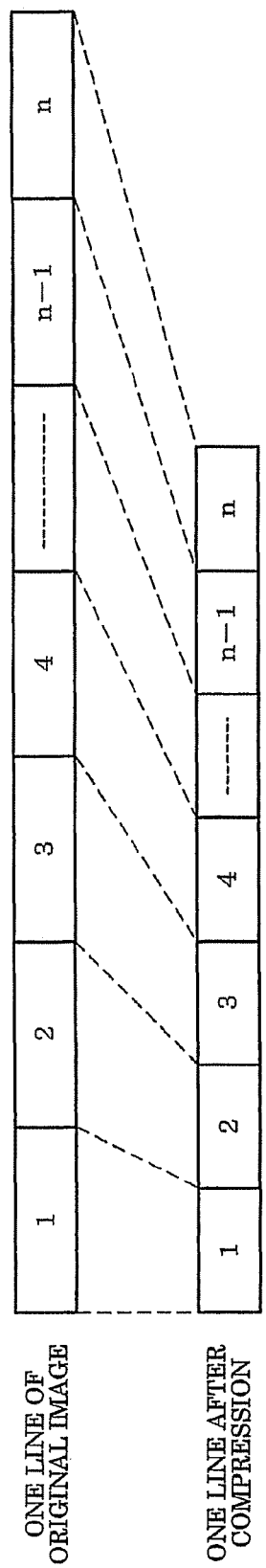
FIG. 3 is a view illustrative of the operation of a compression section shown in FIG. 2.

FIG. 3 is a view illustrative of the operation of the compression section 100 shown in FIG. 2.

The compression section 100 divides the image data of one scan line of the original image into n (n is an integer equal to or larger than two) blocks. The length (bit length, data length, or data size) of each block may be a fixed bit length or an arbitrary bit length. The length of each block may differ depending on the format of the image data of the input image from the baseband engine 10.

The compression section 100 compresses the image data in block units to generate encoded data. Therefore, the compression rate decreases as compared with the case of compressing the image data of one scan line. On the other hand, the compression process and the decompression process are completed in block units. Specifically, even if data in one block is replaced by another piece of data, the decompression results for other blocks are not affected. Therefore, even if the image data of one screen is compressed and stored in the memory 120, data can be written (updated) or read in block units. In this case, it is desirable that the data length of one block be the data size of 8×m (m is a natural number) pixels in order to simplify the processes of the baseband engine 10 and the image processing controller 50.

The invention is not limited to the compression algorithm of the compression section 100. Note that it is desirable that the compression algorithm be the following simple algorithm suitable for incorporation in an LSI.

Figure 4A:
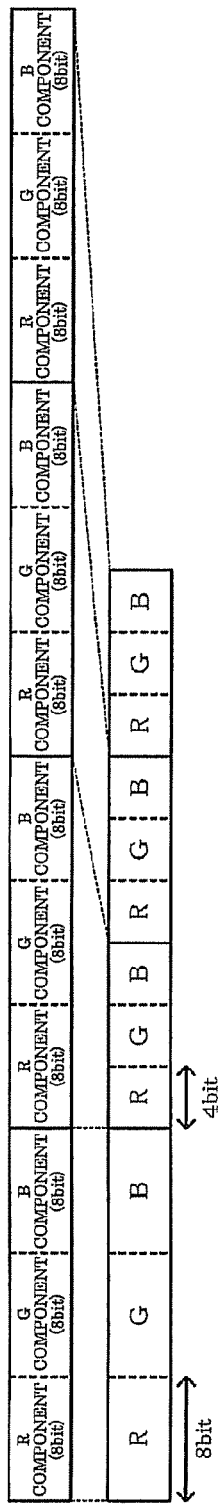
FIGS. 4A, 4B, and 4C are views illustrative of the operation of a compression section corresponding to an image format.
Figure 4B:
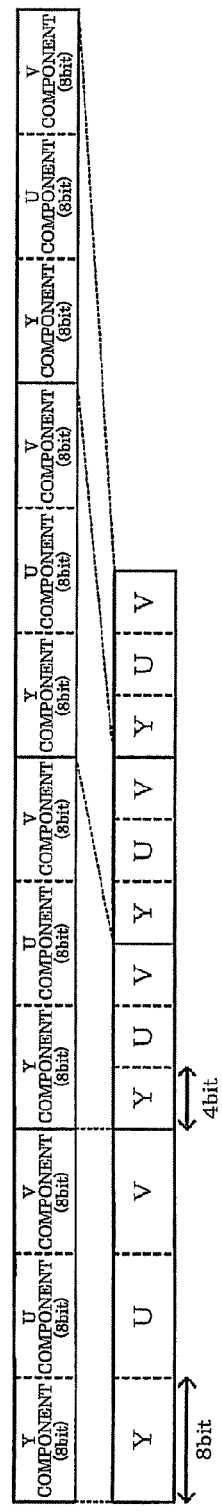
Figure 4C:
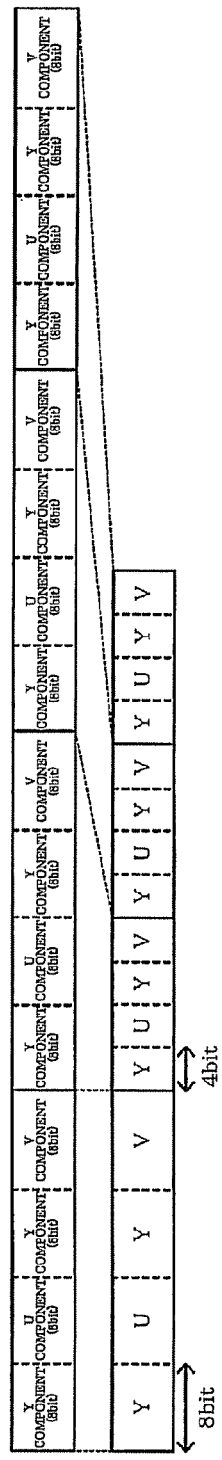

FIGS. 4A, 4B, and 4C show an operation example of the compression section 100.

The following description is given taking an example in which the compression section 100 utilizes a differential pulse code modulation (DPCM) encoding algorithm that subjects the difference between adjacent pixels to pulse code modulation (PCM) encoding.

FIG. 4A shows an example in which the compression section 100 encodes RGB888 format image data by DPCM encoding in units of four pixels. Therefore, the image data of each color component is 8 bits, and the image data of one pixel is 24 bits.

In this case, the compression section 100 does not compress the image data of the first pixel and directly outputs the data as encoded data. The compression section 100 calculates the difference between the image data of the first pixel and the image data of the second pixel, and converts the difference into 4-bit data. Regarding the third and fourth pixels, the compression section 100 calculates the difference from the data obtained by decoding the preceding encoded data, and converts the difference into 4-bit data. Therefore, the image data of the second to fourth pixels is compressed by 50%. In FIG. 4A, the given compression rate (worst compression rate) is 62.5% (=((8+4×3)×3)/(24×3)).

FIG. 4B shows an example in which the compression section 100 encodes YUV444 format image data by DPCM encoding in units of four pixels. Therefore, the image data of the luminance component and the color difference component of each pixel is 8 bits, and the image data of one pixel is 24 bits.

In this case, the compression section 100 does not compress the image data of the first pixel and directly outputs the data as encoded data. The compression section 100 calculates the difference between the image data of the first pixel and the image data of the second pixel, and converts the difference into 4-bit data. Regarding the third and fourth pixels, the compression section 100 calculates the difference from the data obtained by decoding the preceding encoded data, and converts the difference into 4-bit data. Therefore, the image data of the second to fourth pixels is compressed by 50%. In FIG. 4B, the given compression rate (worst compression rate) is 62.5% (=((8+4×3)×3)/(24×3)).

FIG. 4C shows an example in which the compression section 100 encodes YUV422 format image data by DPCM encoding in units of eight pixels. Therefore, the image data of each pixel is 16 bits.

In this case, the compression section 100 does not compress the image data of the first and second pixels and directly outputs the data as encoded data. Regarding the third and eighth pixels, the compression section 100 calculates the difference from the data obtained by decoding the preceding encoded data, and converts the difference into 4-bit data. Therefore, the image data of the third and eighth pixels is compressed by 50%. In FIG. 4C, the given compression rate (worst compression rate) is 62.5% (=((16+2+4×2×6)/(26× 8)).

As described above, the data length of one block of DPCM encoding is caused to differ depending on the image format. When the image format of the image from the baseband engine 10 has been determined, the maximum value (worst value) of the size of the image data after compression can be calculated by employing the DPCM encoding algorithm. Therefore, the size of the area which must be allocated in the memory 120 is determined in advance, whereby a user-friendly image processing controller can be provided. Specifically, when using a high-encoding-rate algorithm such as the Joint Photographic Experts Group (JPEG), the data size after compression cannot be determined until the image data of one screen is completely compressed.

Again referring to FIG. 2, the memory 120 stores the encoded data of which the data size has been compressed by the compression section 100.

The first and second decompression sections 130 and 132 synchronously or asynchronously read the encoded data from the memory 120. Each decompression section decompresses the encoded data in block units (i.e., compression units) in accordance with a decompression algorithm corresponding to the compression algorithm of the compression section 100. The decompressed image data is supplied to the display driver 40.

In this embodiment, a rotation process or an overlay process can be performed on the image data supplied to the display driver 40. As shown in FIG. 2, the image processing controller 50 may include a host interface (hereinafter abbreviated as "I/F") 140, a rotation processing section 150, first and second format conversion sections 160 and 162, an overlay processing section 170, a driver I/F 180, and a control register section 190.

The host I/F 140 interfaces a signal which is input/output through the bus line connected to the baseband engine 10.

The rotation processing section 150 generates an image by rotating the vertical direction of the image supplied from the baseband engine 10 by a given rotation angle with respect to the vertical direction, for example. The rotation processing section 150 includes a plurality of line buffers. Each line buffer stores the image data of one scan line contained in the input image from the baseband engine 10. In this embodiment, since the compression section 100 performs the compression process on a block-block basis, and one scan line is divided into the plurality of blocks, the rotation processing section 150 can implement the rotation process with a reduced number of line buffers. The image data of the image subjected to the rotation process by the rotation processing section 150 is supplied to the compression section 100 (encoding section).

The first format conversion section 160 converts the format of the image data decompression by the first decompression section 130. When directly supplying the format of the image data from the baseband engine 10 to the display driver 40, the process of the first format conversion section 160 may be disabled.

The second format conversion section 162 converts the format of the image data decompression by the second decompression section 132. When directly supplying the format of the image data from the baseband engine 10 to the display driver 40, the process of the second format conversion section 162 may be disabled.

The overlay processing section 170 performs an overlay process on the image data output from the first and second format conversion sections 160 and 162. In FIG. 2, the image processing controller 50 may have a configuration in which the second decompression section 132, the second format conversion section 162, and the overlay processing section 170 are omitted.

The driver I/F 180 interfaces a signal input/output through the bus line connected to the display driver 40. For example, the driver I/F 180 outputs the image data of the image subjected to the overlay process by the overlay processing section 170 to the display driver 40 through the bus line.

The control register section 190 includes a plurality of control registers. Each control register can be accessed from the baseband engine 10. A control signal corresponding to the data set in each control register is output. Each control signal is supplied to each section of the image processing controller 50. Each section of the image processing controller 50 is controlled based on the control signal from the control register section 190. Therefore, the baseband engine 10 can control each section of the image processing controller 50 by setting data in the control register of the control register section 190.

When the capacity of each of the line buffers of the rotation processing section 150 is LB bits, the number of pixels of one scan line the input image is referred to as H, and the number of bits of one pixel of the input image is referred to as P, the data length of one block (i.e., compression processing unit) may be a value equal to or less than f(LB/H/P) (where the function f indicates a function omitting a decimal point and a decimal place).

According to this configuration, since the image data is compressed while effectively utilizing the capacity of the line buffer to a maximum extent, the capacity of the line buffer of the rotation processing section 150 can be minimized.

When the compression section 100 encodes the image data of the input image at a compression rate equal to or higher than the given compression rate W, the bit width (access unit) of the memory 120 is referred to as B, and the number of bits of the input image per pixel is referred to as P, the data length of one block (i.e., compression processing unit) may be a value equal to or less than f(B/W/P) (where the function f indicates a function omitting a decimal point and a decimal place).

This enables the number of accesses to the memory 120 to be reduced, whereby the compression process can be performed quickly even if the screen size increases. Therefore, an increase in capacity of the memory 120 can be suppressed.

Each section of the image processing controller 50 shown in FIG. 2 is described below.

2.1 Control Register Section

Figure 5:
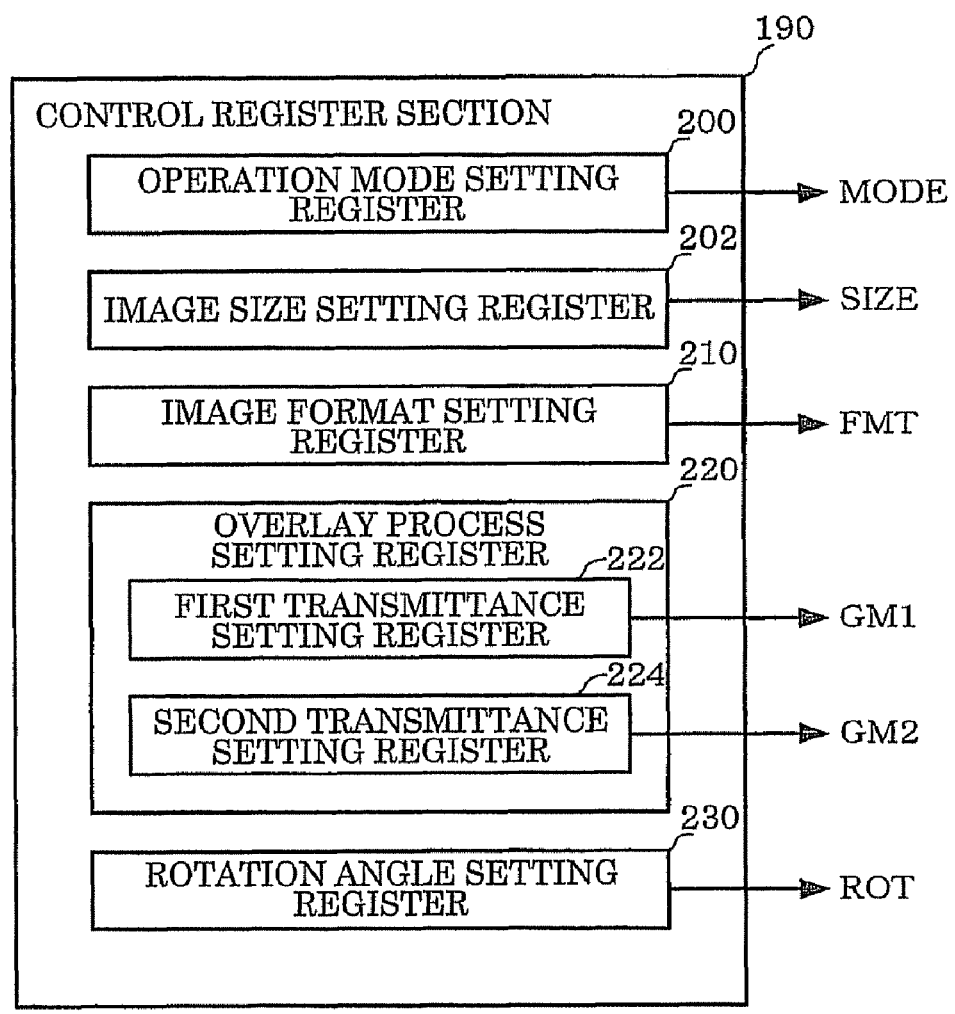
FIG. 5 is a view schematically showing the configuration of a control register section shown in FIG. 2.

FIG. 5 schematically shows the configuration of the control register section shown in FIG. 2.

The control register section 190 includes an operation mode setting register 200, an image size setting register 202, an image format setting register 210, an overlay process setting register 220, and a rotation angle setting register 230.

Setting data (control data) which sets the operation mode of the image processing controller 50 is set in the operation mode setting register 200. A control signal MODE corresponding to the setting data is output from the operation mode setting register 200. The image processing controller 50 can operate in a line mode (first operation mode) or a partial mode (second operation mode), for example.

The image processing controller 50 set in the line mode causes the compression section 100 to perform a compression process in scan line units and causes the first and second decompression sections 130 and 132 to perform a decompression process in scan line units. The line mode is not suitable for the rotation process since a buffer for one screen is needed when rotating the image from the baseband engine 10. On the other hand, the data size of the image data of one scan line can be reduced after compression as compared with the partial mode.

The image processing controller 50 set in the partial mode causes the compression section 100 to perform a compression process on a block-block basis, where one scan line is divided into the plurality of blocks, and causes the first and second decompression sections 130 and 132 to perform a decompression process on a block-block basis. In the partial mode, the data size after compression increases as compared with the line mode. On the other hand, the partial mode enables the image from the baseband engine 10 to be rotated, only necessary data to be read from the memory 120, or data stored in the memory 120 to be updated.

Setting data corresponding to the size of the image from the baseband engine 10 in the horizontal scan direction of the image and the vertical scanning direction is set in the image size setting register 202. A control signal SIZE corresponding to the setting data is output from the image size setting register 202. The image processing controller 50 can determine the data size of one scan line and the number of scan lines based on the setting data set in the image size setting register 202.

Setting data corresponding to the format of the image data of the image from the baseband engine 10 is set in the image format setting register 210. A control signal FMT corresponding to the setting data is output from the image format setting register 210. The image processing controller 50 performs a compression process while changing the data size of one block as shown in FIGS. 4A to 4C corresponding to the image format designated by the image format setting register 210. The first and second format conversion sections 160 and 162 converts the image data into RGB888 format image data specified in advance for the display driver 40 corresponding to the image format designated by the image format setting register 210.

The overlay process setting register 220 includes first and second transmittance setting registers 222 and 224. Setting data corresponding to the transmittance of the image data processed by the first decompression section 130 and the first format conversion section 160 is set in the first transmittance setting register 222. A control signal GM1 corresponding to the setting data is output from the first transmittance setting register 222. Setting data corresponding to the transmittance of the image data processed by the second decompression section 132 and the second format conversion section 162 is set in the second transmittance setting register 224. A control signal GM2 corresponding to the setting data is output from the second transmittance setting register 224. The overlay processing section 170 performs an overlay process on the image data output from the first and second format conversion sections 160 and 162 using the transmittances set in the first and second transmittance setting registers 222 and 224.

Setting data corresponding to an angle by which the image is rotated with respect to the vertical direction of the image from the baseband engine 10 (e.g., around the center position of the image) is set in the rotation angle setting register 230. A control signal ROT corresponding to the setting data is output from the rotation angle setting register 230. In this embodiment, setting data corresponding to a rotation angle of 0°, 90°, 180°, or 270° with respect to the vertical direction of the image from the baseband engine 10 (e.g., around the center position of the image) is set in the rotation angle setting register 230. The rotation processing section 150 performs the rotation process based on the setting data set in the rotation angle setting register 230.

2.2 Rotation Processing Section

Figure 6:
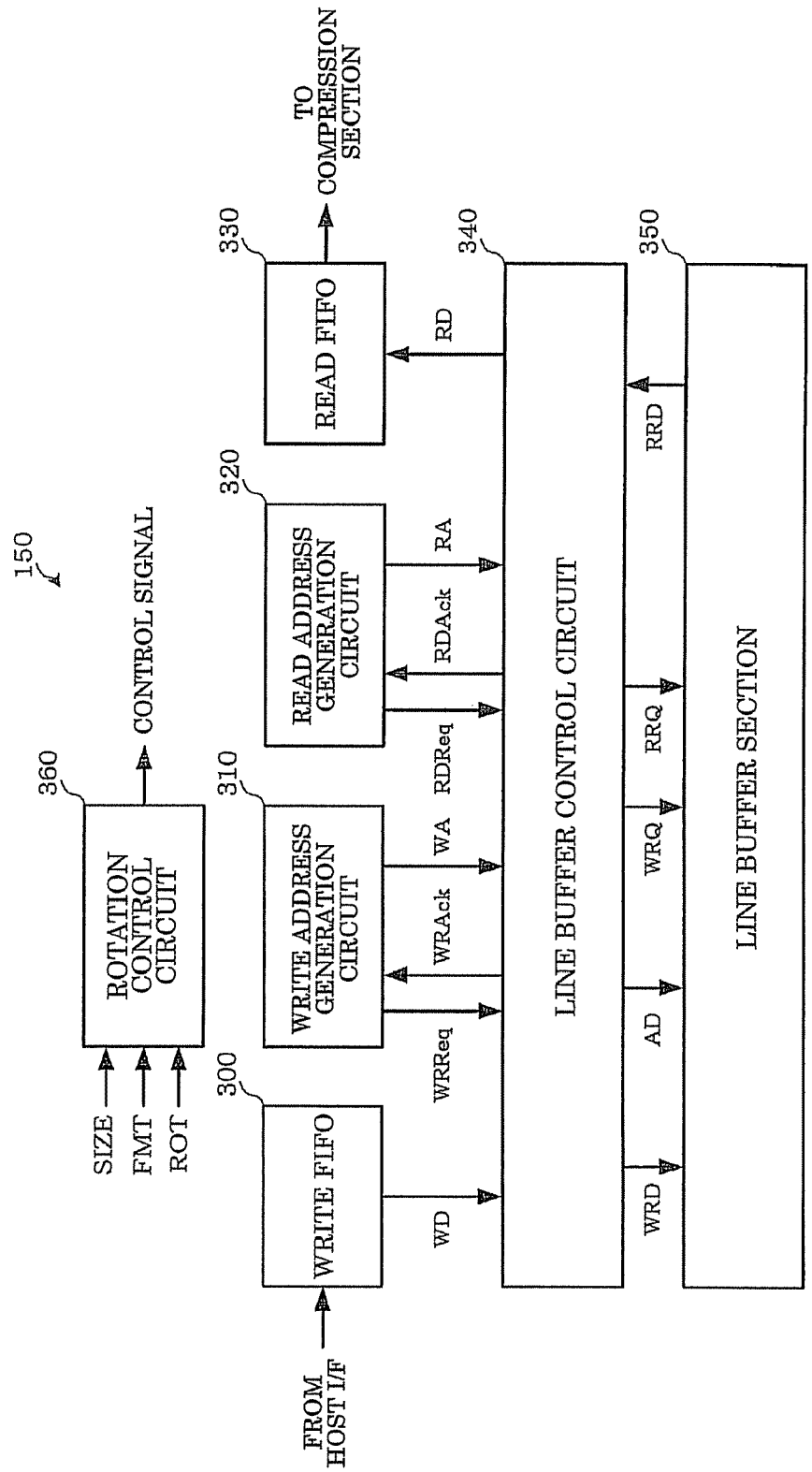
FIG. 6 is a block diagram showing a configuration example of a rotation processing section shown in FIG. 2.

FIG. 6 is a block diagram showing a configuration example of the rotation processing section 150 shown in FIG. 2.

The rotation processing section 150 includes a write First-In First-Out (FIFO) 300, a write address generation circuit 310, a read address generation circuit 320, a read FIFO 330, a line buffer control circuit 340, a line buffer section 350, and a rotation control circuit 360.

The line buffer section 350 includes a plurality of line buffers, each of the line buffers being capable of storing at least image data of scan lines in the same number as the number of pixels of one block (i.e., compression unit of the compression section 100). For example, when one block is in units of four or eight pixels, the line buffer section 350 includes a line buffer which can store image data of eight scan lines (maximum value). When one block is in units of four pixels, the line buffer section 350 includes a line buffer which can store image data of four scan lines. Therefore, the line buffer section 350 need not include a line buffer which can store image data of one screen.

Image data from the host I/F 140 is sequentially stored in the write FIFO 300 in an input image raster scan direction.

An address is allocated to an access region of each line buffer included in the line buffer section 350. The write address generation circuit 310 generates an address WA of a data write area of the storage area of the line buffer section 350. The write address generation circuit 310 outputs a write request WRReq and the write address WA to the line buffer control circuit 340, and receives a write acknowledgment WRAck from the line buffer control circuit 340 to determine that the write request WRReq has been received by the line buffer control circuit 340.

The read address generation circuit 320 generates an address RA of a data read area of the storage area of the line buffer section 350. The read address generation circuit 320 outputs a read request RDReq and the read address RA to the line buffer control circuit 340, and receives a read acknowledgment RDAck from the line buffer control circuit 340 to determine that the read request RDReq has been received by the line buffer control circuit 340.

The line buffer control circuit 340 arbitrates between the write request WRReq from the write address generation circuit 310 and the read request RDReq from the read address generation circuit 320. When the line buffer control circuit 340 has received the write request WRReq as a result of arbitration, the line buffer control circuit 340 outputs the write acknowledgment WRAck to the write address generation circuit 310. The line buffer control circuit 340 outputs a write request WRQ to the line buffer section 350. The line buffer control circuit 340 outputs an address AD to the line buffer section 350 using the write address WA from the write address generation circuit 310, and outputs data WD read from the write FIFO 300 to the line buffer section 350 as write data WRD. When the line buffer control circuit 340 has received the read request RDReq as a result of arbitration, the line buffer control circuit 340 outputs the read acknowledgment RDAck to the read address generation circuit 320. The line buffer control circuit 340 outputs a read request RRQ to the line buffer section 350. The line buffer control circuit 340 outputs the address AD to the line buffer section 350 using the read address RA from the read address generation circuit 320, and acquires read data RRD from the line buffer section 350. The read data RRD is stored in the read FIFO 330 as data RD, and is sequentially read from the compression section 100.

The rotation control circuit 360 receives the control signals FMT, SIZE, and ROT and generates a control signal. The control signal is used to control each section of the rotation processing section 150 shown in FIG. 6. The rotation control circuit 360 determines the data size of one scan line and the number of scan lines based on the control signals FMT and SIZE. The rotation control circuit 360 determines the rotation angle based on the control signal ROT, and the read address generation circuit 320 generates the read address RA corresponding to the angle.

Figure 7:
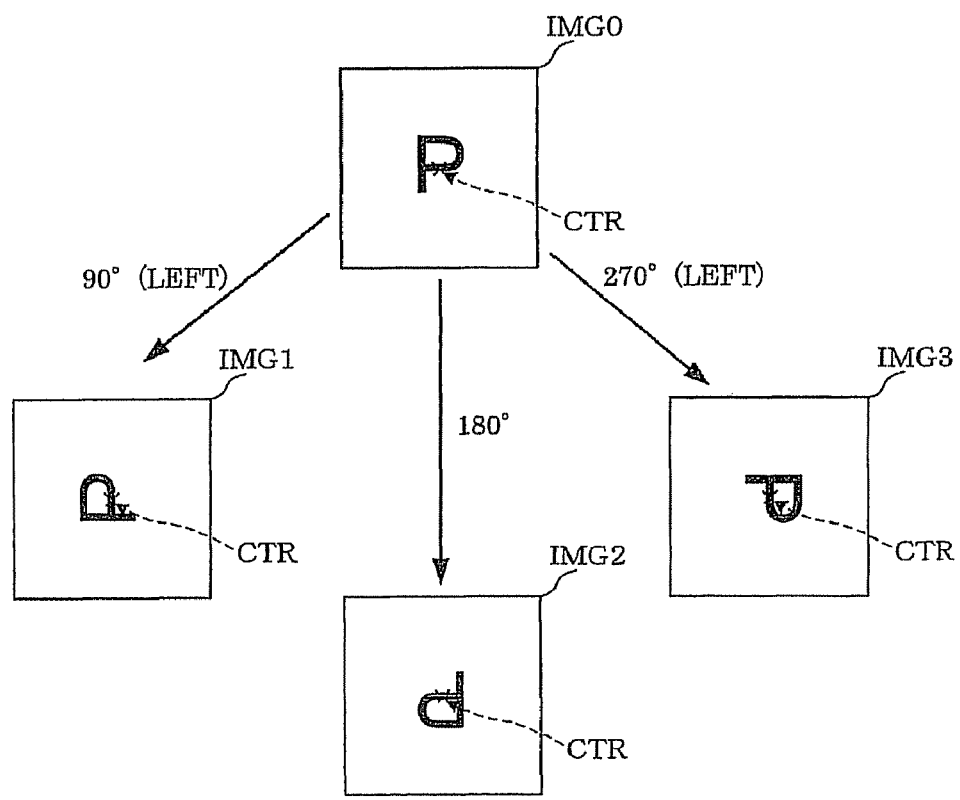
FIG. 7 is a view illustrative of the operation of the rotation processing section shown in FIG. 6.

FIG. 7 is a view illustrative of the operation of the rotation processing section 150 shown in FIG. 6.

The rotation processing section 150 rotates an input image IMG0 (original image) from the baseband engine 10 corresponding to a rotation angle around a rotation axis which passes through a center position CTR of the original image.

When the setting data set in the rotation angle setting register 230 of the control register section 190 is setting data corresponding to a rotation angle of 90°, the rotation processing section 150 stores the image data in the memory 120 so that an image IMG1 is formed based on the image data supplied to the display driver 40. When the setting data set in the rotation angle setting register 230 is setting data corresponding to a rotation angle of 180°, the rotation processing section 150 stores the image data in the memory 120 so that an image IMG2 is formed based on the image data supplied to the display driver 40. When the setting data set in the rotation angle setting register 230 is setting data corresponding to a rotation angle of 270°, the rotation processing section 150 stores the image data in the memory 120 so that an image IMG3 is formed based on the image data supplied to the display driver 40.

Figure 8A:
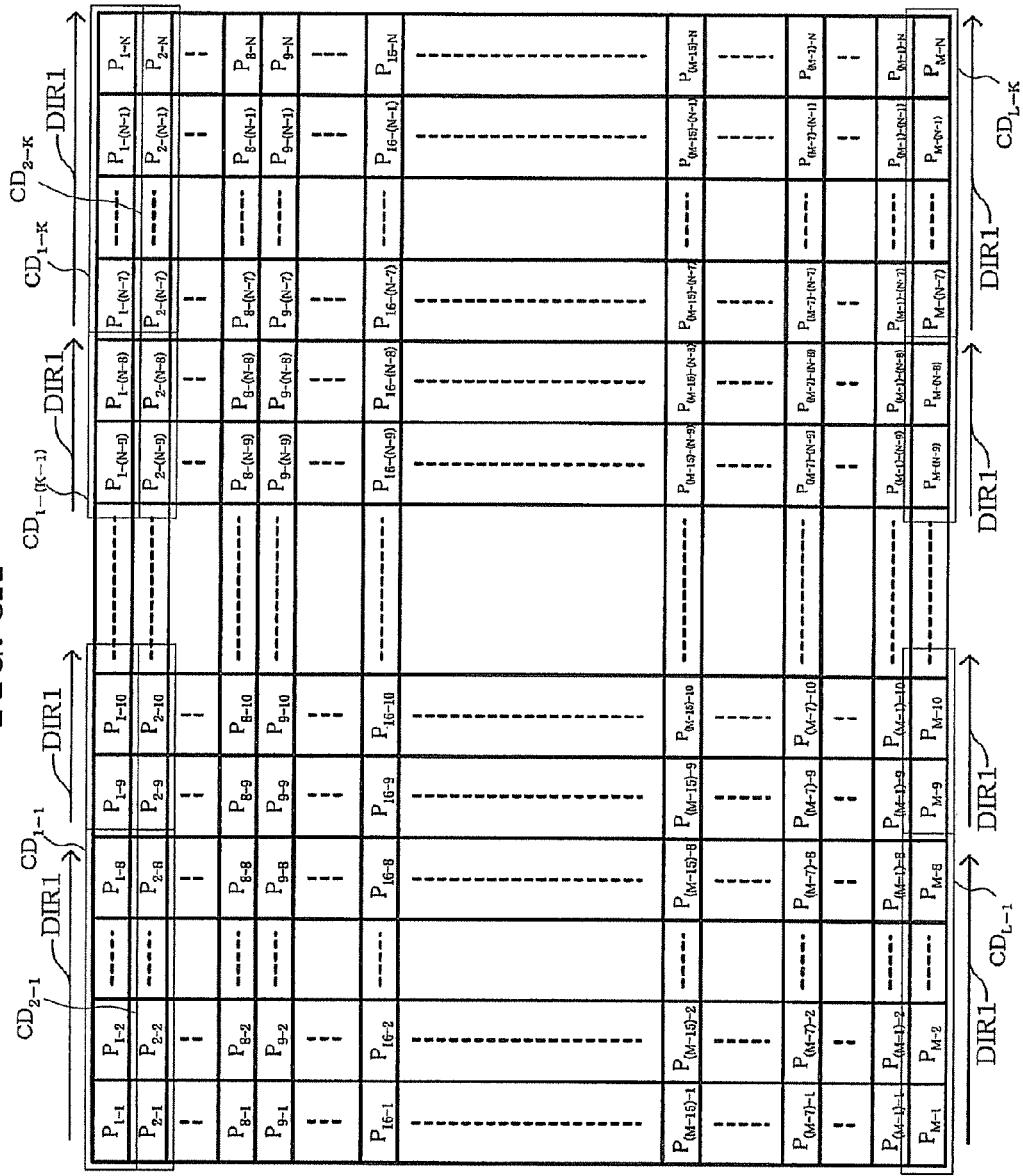
FIGS. 8A and 8B are views illustrative of the operation of a rotation processing section when the rotation angle is 0°.
Figure 8B:
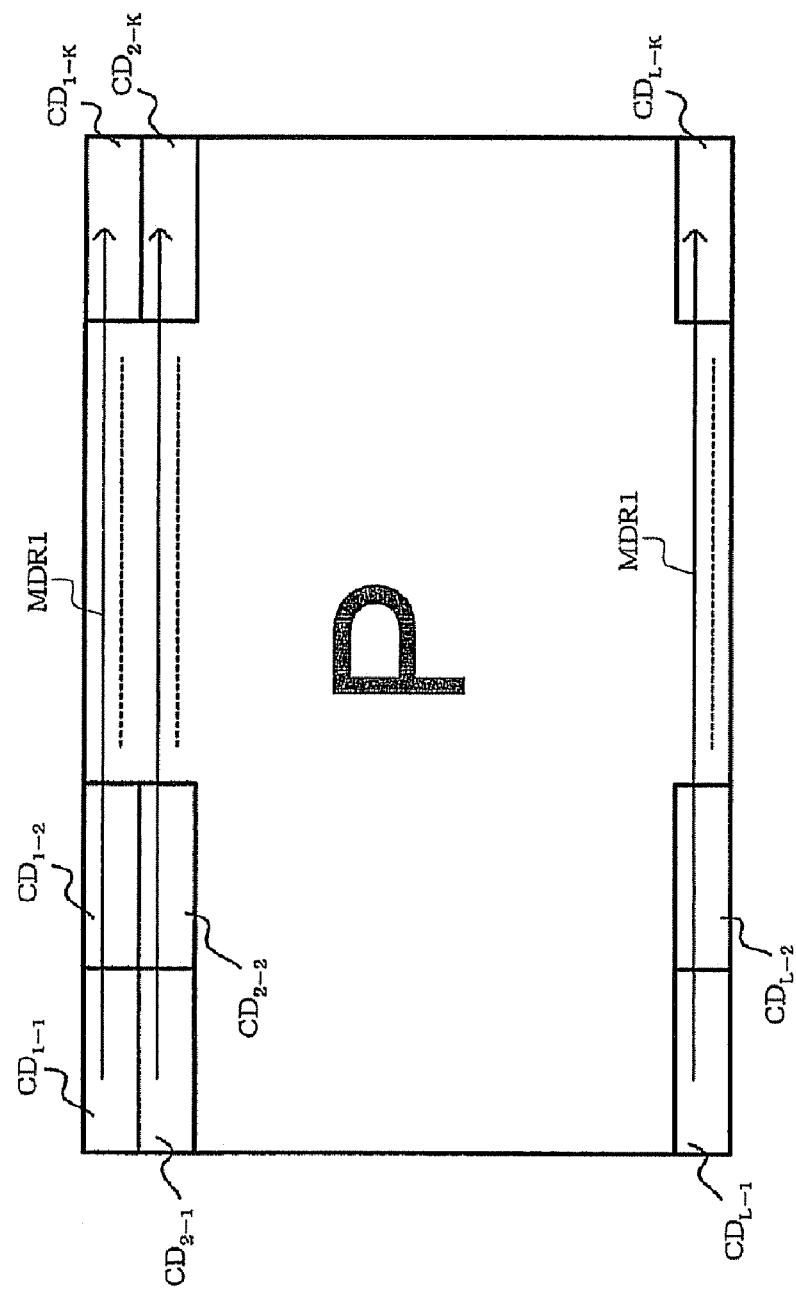

FIGS. 8A and 8B are views illustrative of the operation of the rotation processing section 150 when the rotation angle is 0°.

FIG. 8A is a view showing the input image IMG0 shown in FIG. 7 in which the image data is arranged in pixel units. In FIG. 8A, N (N is an integer equal to or larger than two) pixels are arranged in the horizontal scan direction of the input image IMG0, and M (M is an integer equal to or larger than two) pixel are arranged in the vertical scan direction of the input image IMG0. Pixels $P_{1-1}, P_{1-2}, \ldots, P_{1-N}$ are arranged in the horizontal scan direction of the input image IMG0, and pixels $P_{1-1}, P_{2-1}, \ldots, P_{M-1}$ are arranged in the vertical scan direction of the input image IMG0.

FIG. 8B schematically shows a state in which the image data after the rotation process (rotation angle: 0°) is stored in the memory 120.

In this example, the compression section 100 performs the compression process in eight pixel units. In FIG. 8A, the pixels $P_{1-1}$ to $P_{1-8}$ are compressed as shown in FIG. 4C in a direction DIR1 to generate encoded data $CD_{1-1}$. Likewise, the pixels $P_{1-9}$ to $P_{1-16}$, the pixels $P_{1-17}$ to $P_{1-24}, \ldots$, the pixels $P_{1-(N-7)}$ to $P_{1-N}$, the pixels $P_{2-1}$ to $P_{2-8}, \ldots$, the pixels $P_{2-(N-7)}$ to $P_{2-N}, \ldots$, the pixels $P_{M-1}$ to $P_{M-8}, \ldots$, and the pixels $P_{M-(N-7)}$ to $P_{M-N}$ are compressed in the direction DIR1 to generate encoded data $CD_{1-2}, CD_{1-3}, \ldots, CD_{1-K}$ (K is a natural number), $CD_{2-1}, \ldots, CD_{2-K}, \ldots, CD_{L-1}$ (L is a natural number), ..., and $CD_{L-K}$.

The encoded data thus generated is stored in the memory 120 in an order MDR1 shown in FIG. 8B. Specifically, the encoded data $CD_{1-1}$ to $CD_{1-K}$ is stored in the memory 120 in the order MDR1, and the encoded data $CD_{2-1}$ to $CD_{1-K}$ is then stored in the memory 120 in the order MDR1. The write address generation circuit 310 generates the write address of the line buffer section 350 so that the compression process is performed to the order shown in FIG. 8B.

As a result, it suffices that the first and second decompression sections 130 and 132 read the encoded data from the memory 120 in a raster scan direction. Specifically, the read address generation circuit 320 generates the read address of the line buffer section 350 so that encoded data $CD_{1-1}, CD_{1-2}, \ldots, CD_{1-K}, CD_{2-1}, CD_{2-2}, \ldots, CD_{2-K}, CD_{L-1}, \ldots,$ and $CD_{L-K}$ is read in that order, and the decompression process is sequentially performed on the encoded data, whereby the image data of the image IMG0 when the rotation angle is 0° can be output.

Figure 9A:
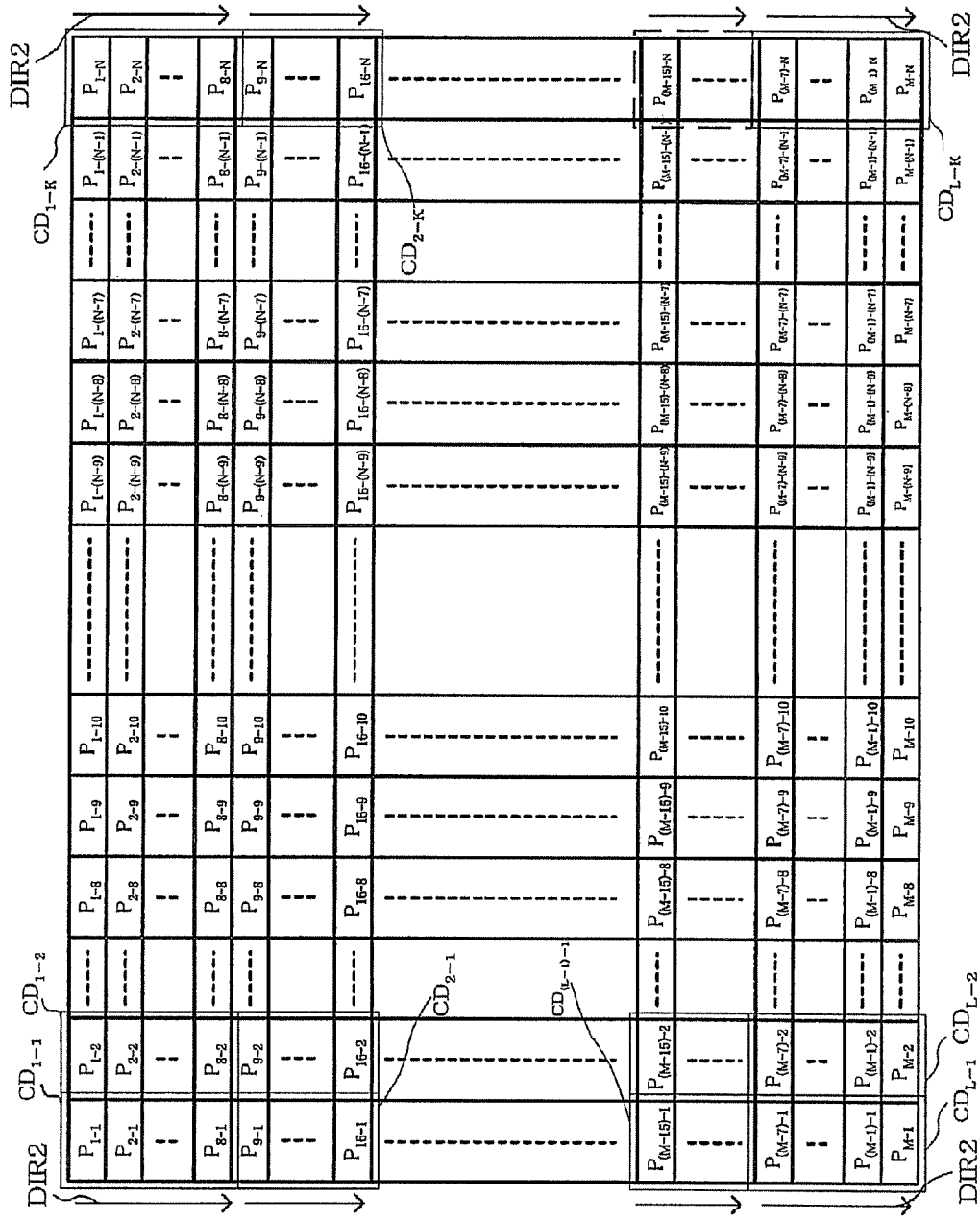
FIGS. 9A and 9B are views illustrative of the operation of a rotation processing section when the rotation angle is 90°.
Figure 9B:
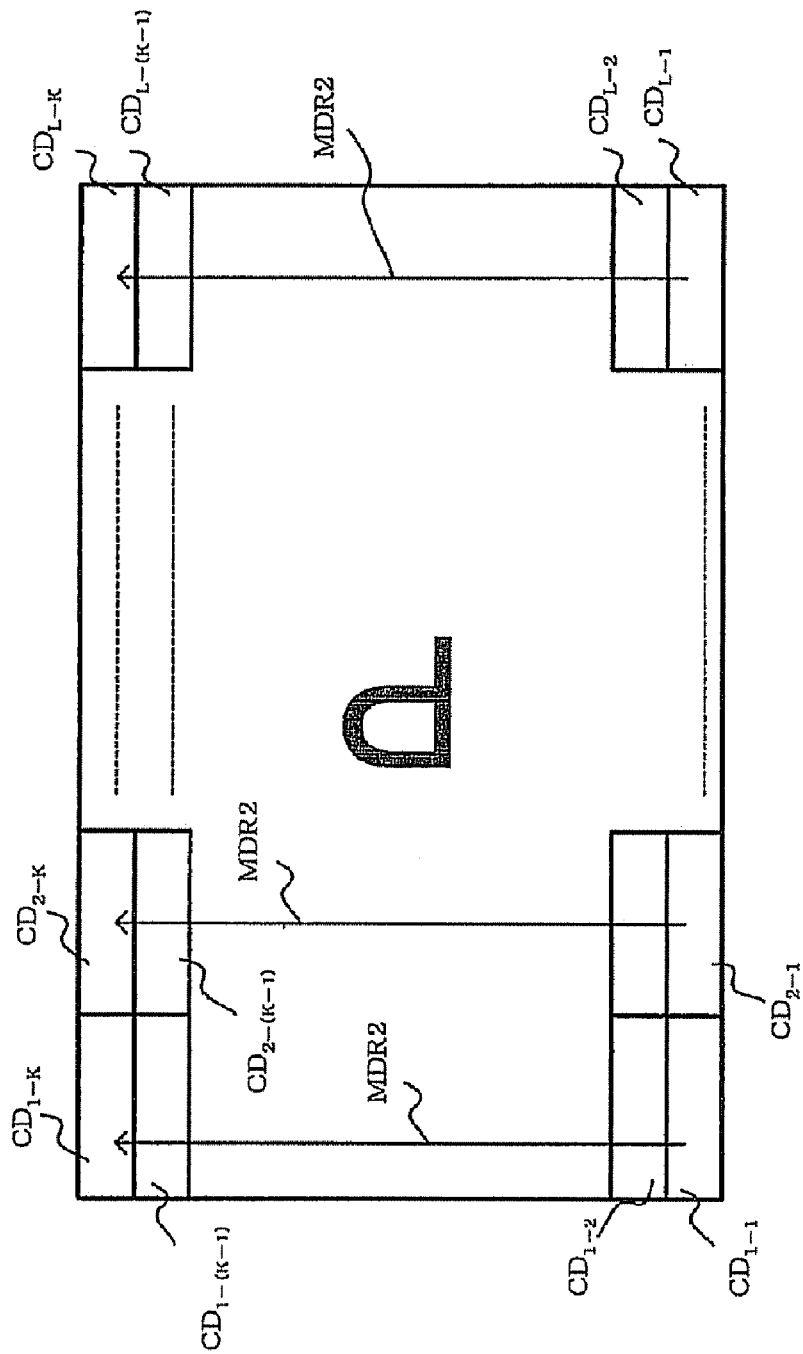

FIGS. 9A and 9B are views illustrative of the operation of the rotation processing section 150 when the rotation angle is 90°.

FIG. 9A is a view showing the input image IMG0 shown in FIG. 7 in which the image data is arranged in pixel units. In FIG. 9A, N pixels are arranged in the horizontal scan direction of the input image IMG0, and M pixel are arranged in the vertical scan direction of the input image IMG0. The pixels $P_{1-1}, P_{1-2}, \ldots, P_{1-N}$ are arranged in the horizontal scan direction of the input image IMG0, and the pixels $P_{1-1}, P_{2-1}, \ldots, P_{M-1}$ are arranged in the vertical scan direction of the input image IMG0.

FIG. 9B schematically shows a state in which the image data after the rotation process (rotation angle: 90°) is stored in the memory 120.

In this example, the compression section 100 performs the compression process in eight pixel units. In FIG. 9A, the pixels $P_{1-1}$ to $P_{8-1}$ are compressed as shown in FIG. 4C in a direction DIR2 to generate encoded data $CD_{1-1}$. Likewise, the pixels $P_{1-2}$ to $P_{8-2}$, the pixels $P_{1-3}$ to $P_{8-3}, \ldots$, the pixels $P_{1-N}$ to $P_{8-N}$, the pixels $P_{9-1}$ to $P_{16-1}, \ldots$, the pixels $P_{9-2}$ to $P_{16-2}, \ldots$, the pixels $P_{9-N}$ to $P_{16-N}, \ldots$, the pixels $P_{M-(N-7)}$ to $P_{M-1}, \ldots$, and the pixels $P_{(M-7)-N}$ to $P_{M-N}$ are compressed in the direction DIR2 to generate encoded data $CD_{1-2}, CD_{1-3}, \ldots, CD_{1-K}, CD_{2-1}, CD_{2-2}, \ldots, CD_{2-K}, \ldots, CD_{L-1}, \ldots,$ and $CD_{L-K}$.

The encoded data thus generated is stored in the memory 120 in an order MDR2 shown in FIG. 9B. Specifically, the encoded data $CD_{1-1}$ to $CD_{1-K}$ is stored in the memory 120 in the order MDR2, and the encoded data $CD_{2-1}$ to $CD_{2-K}$ is then stored in the memory 120 in the order MDR2. The write address generation circuit 310 generates the write address of the line buffer section 350 so that the compression process is performed to the order shown in FIG. 9B.

As a result, it suffices that the first and second decompression sections 130 and 132 read the encoded data from the memory 120 in a raster scan direction. Specifically, the read address generation circuit 320 generates the read address of the line buffer section 350 so that encoded data $CD_{1-K}, CD_{2-K}, \ldots, CD_{L-K}, CD_{1-(K-1)}, CD_{2-(K-1)}, \ldots, CD_{L-(K-1)}, \ldots, CD_{1-1}, \ldots,$ and $CD_{L-1}$ is read in that order, and the decompression process is sequentially performed on the encoded data, whereby the image data of the image IMG1 when the rotation angle is 90° can be output.

Figure 10A:
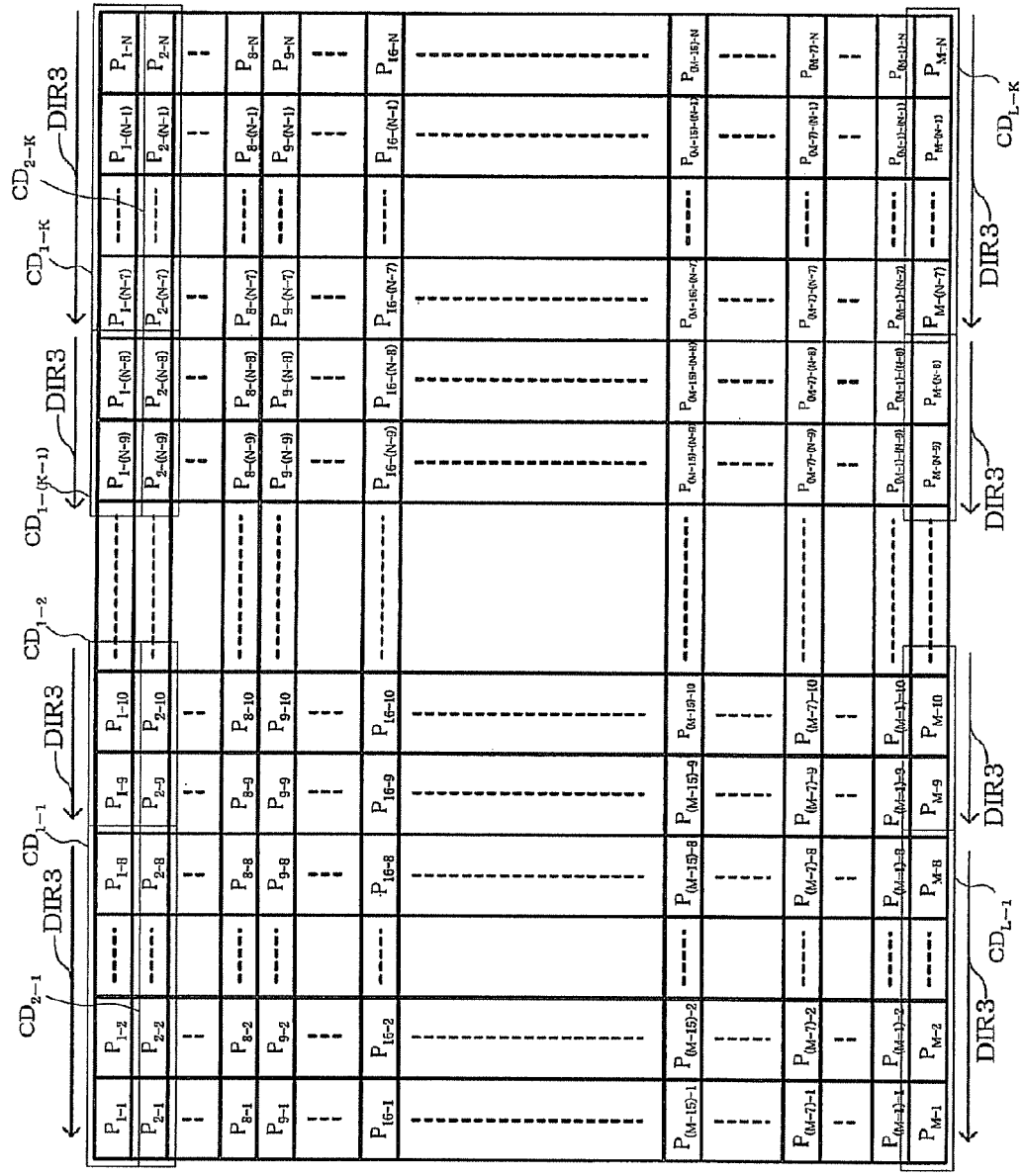
FIGS. 10A and 10B are views illustrative of the operation of a rotation processing section when the rotation angle is 180°.
Figure 10B:
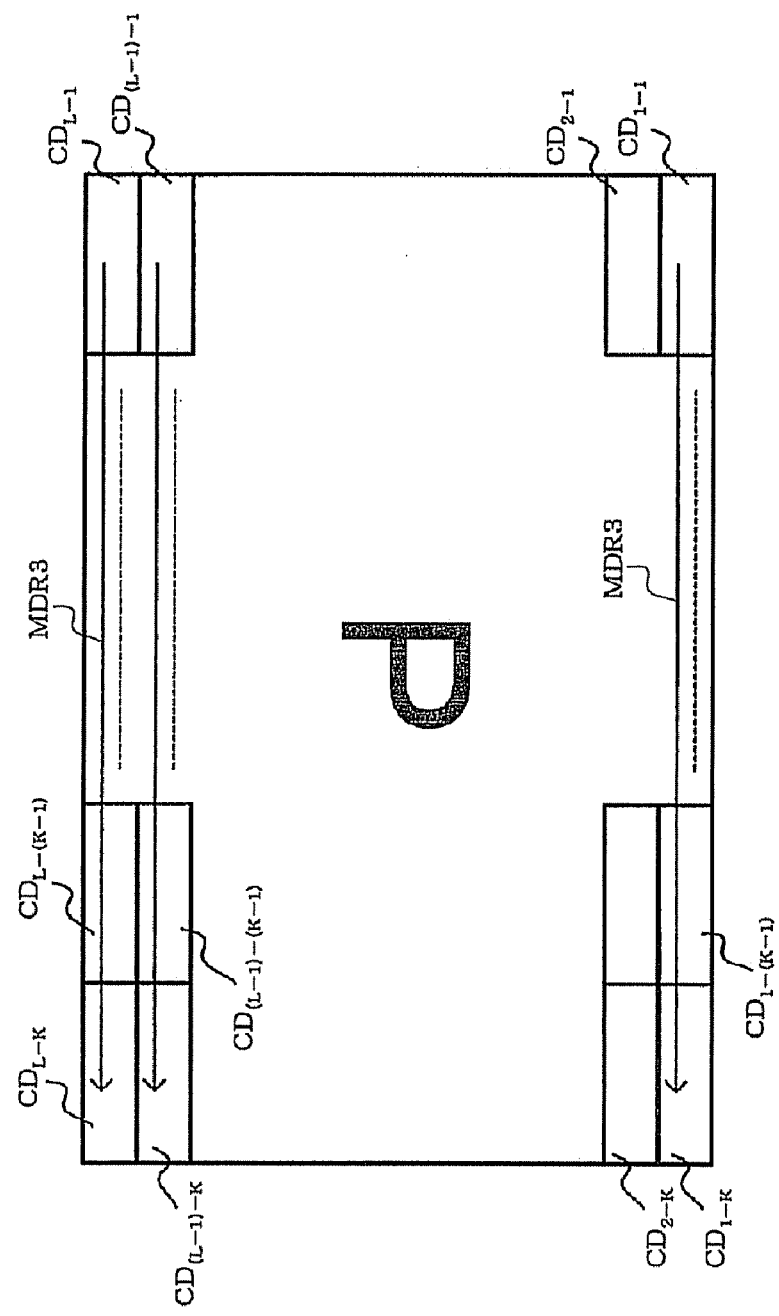

FIGS. 10A and 10B are views illustrative of the operation of the rotation processing section 150 when the rotation angle is 180°.

FIG. 10A is a view showing the input image IMG0 shown in FIG. 7 in which the image data is arranged in pixel units. In FIG. 10A, N pixels are arranged in the horizontal scan direction of the input image IMG0, and M pixel are arranged in the vertical scan direction of the input image IMG0. The pixels $P_{1-1}, P_{1-2}, \ldots, P_{1-N}$ are arranged in the horizontal scan direction of the input image IMG0, and the pixels $P_{1-1}, P_{2-1}, \ldots, P_{M-1}$ are arranged in the vertical scan direction of the input image IMG0.

FIG. 10B schematically shows a state in which the image data after the rotation process (rotation angle: 180°) is stored in the memory 120.

In this example, the compression section 100 performs the compression process in eight pixel units. In FIG. 10A, the pixels $P_{1-8}$ to $P_{1-1}$ are compressed as shown in FIG. 4C in a direction DIR3 to generate encoded data $CD_{1-1}$. Likewise, the pixels $P_{1-16}$ to $P_{1-9}$, . . . , the pixels $P_{1-N}$ to $P_{1-(N-7)}$, the pixels $P_{2-8}$ to $P_{2-1}$, the pixels $P_{2-16}$ to $P_{2-9}$, . . . , the pixels $P_{2-N}$ to $P_{2-(N-7)}$, . . . , the pixels $P_{M-8}$ to $P_{M-1}$, the pixels $P_{M-N}$ to $P_{M-(N-7)}$ are compressed in the direction DIR3 to generate encoded data $CD_{1-2}$, . . . , $CD_{1-K}$, $CD_{2-1}$, $CD_{2-2}$, . . . , $CD_{2-K}$, . . . , $CD_{L-1}$, . . . , and $CD_{L-K}$.

The encoded data thus generated is stored in the memory 120 in an order MDR3 shown in FIG. 10B. Specifically, the encoded data $CD_{1-1}$ to $CD_{1-K}$ is stored in the memory 120 in the order MDR3, and the encoded data $CD_{2-1}$ to $CD_{2-K}$ is then stored in the memory 120 in the order MDR3. The write address generation circuit 310 generates the write address of the line buffer section 350 so that the compression process is performed to the order shown in FIG. 10B.

As a result, it suffices that the first and second decompression sections 130 and 132 read the encoded data from the memory 120 in a raster scan direction. Specifically, the read address generation circuit 320 generates the read address of the line buffer section 350 so that encoded data $CD_{L-K}$, $CD_{L-(K-1)}$, . . . , $CD_{L-1}$, $CD_{(L-1)-K}$, $CD_{(L-1)-(K-1)}$, . . . , $CD_{(L-1)-1}$, . . . , $CD_{1-K}$, . . . , and $CD_{1-1}$ is read in that order, and the decompression process is sequentially performed on the encoded data, whereby the image data of the image IMG2 when the rotation angle is 180° can be output.

Figure 11A:
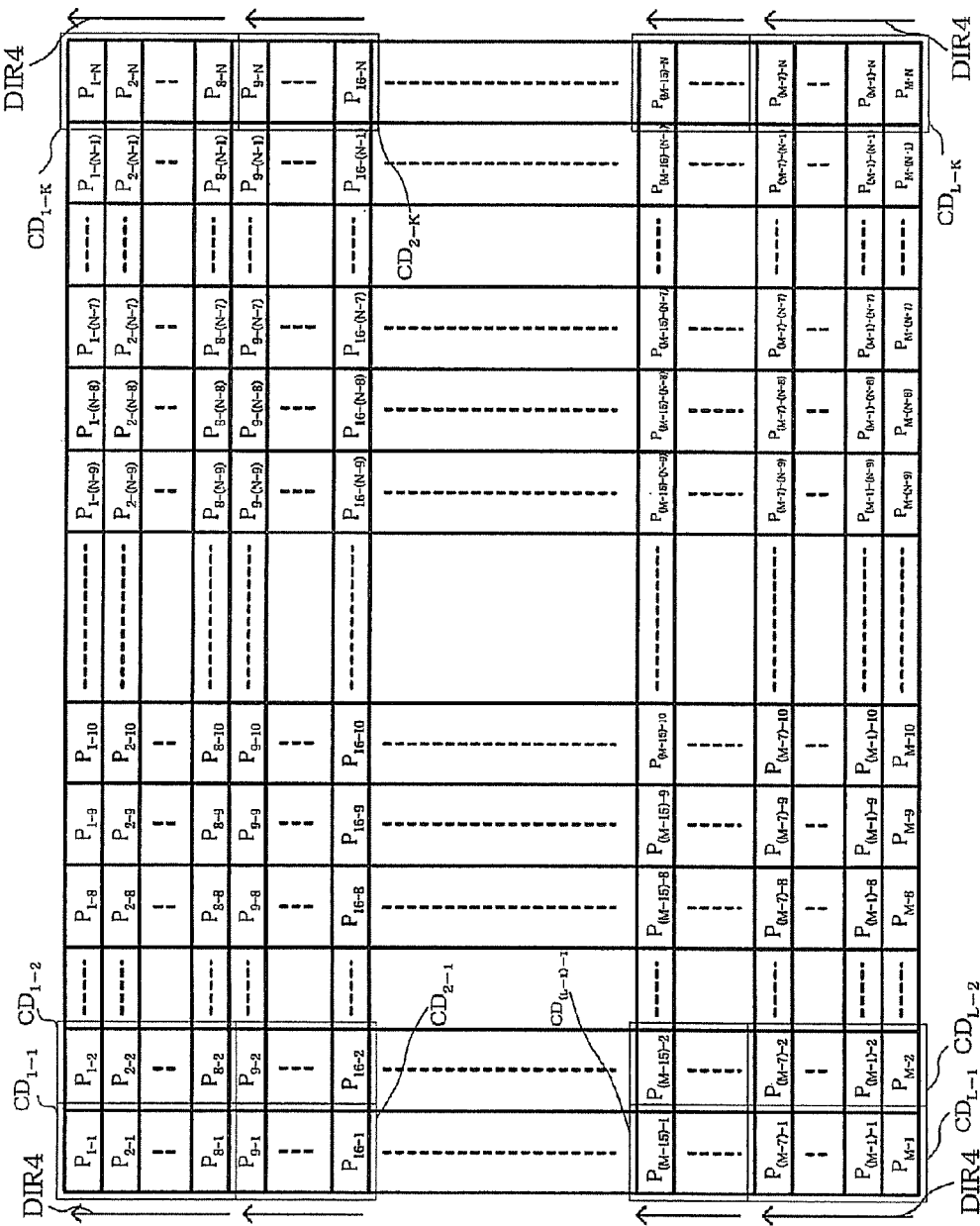
FIGS. 11A and 11B are views illustrative of the operation of a rotation processing section when the rotation angle is 270°.
Figure 11B:
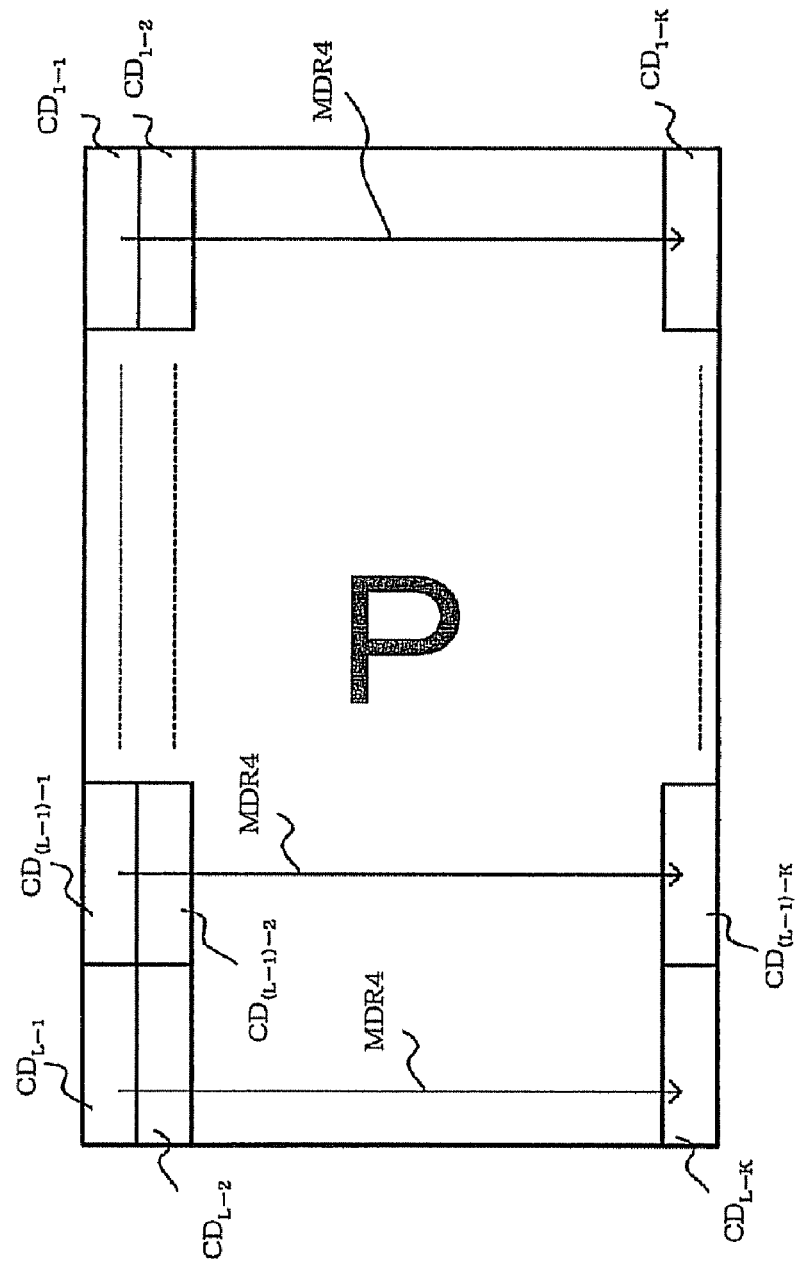

FIGS. 11A and 11B are views illustrative of the operation of the rotation processing section 150 when the rotation angle is 270°.

FIG. 11A is a view showing the input image IMG0 shown in FIG. 7 in which the image data is arranged in pixel units. In FIG. 11A, N pixels are arranged in the horizontal scan direction of the input image IMG0, and M pixel are arranged in the vertical scan direction of the input image IMG0. The pixels $P_{1-1}$, $P_{1-2}$, . . . , $P_{1-N}$ are arranged in the horizontal scan direction of the input image IMG0, and the pixels $P_{1-1}$, $P_{2-1}$, . . . , $P_{M-1}$ are arranged in the vertical scan direction of the input image IMG0.

FIG. 11B schematically shows a state in which the image data after the rotation process (rotation angle: 270°) is stored in the memory 120.

In this example, the compression section 100 performs the compression process in eight pixel units. In FIG. 11A, the pixels $P_{1-1}$ to $P_{8-1}$ are compressed as shown in FIG. 4C in a direction DIR4 to generate encoded data $CD_{1-1}$. Likewise, the pixels $P_{1-2}$ to $P_{8-2}$, . . . , the pixels $P_{1-N}$ to $P_{8-N}$, the pixels $P_{9-1}$ to $P_{16-1}$, . . . , the pixels $P_{9-2}$ to $P_{16-2}$, . . . , the pixels $P_{9-N}$ to $P_{16-N}$, . . . , the pixels $P_{(M-7)-1}$ to $P_{M-1}$, . . . , and the pixels $P_{(M-7)-N}$ to $P_{M-N}$ are compressed in the direction DIR4 to generate encoded data $CD_{1-2}$, . . . , $CD_{1-K}$, $CD_{2-1}$, . . . , $CD_{2-K}$, . . . , $CD_{L-1}$, . . . , and $CD_{L-K}$.

The encoded data thus generated is stored in the memory 120 in an order MDR4 shown in FIG. 11B. Specifically, the encoded data $CD_{1-1}$ to $CD_{1-K}$ is stored in the memory 120 in the order MDR4, the encoded data $CD_{2-1}$ to $CD_{2-K}$ is then stored in the memory 120 in the order MDR4, and the encoded data $CD_{L-1}$ to $CD_{L-K}$ is then stored in the memory 120 in the order MDR4. Specifically, the write address generation circuit 310 generates the write address of the line buffer section 350 so that the compression process is performed to the order shown in FIG. 11B.

As a result, it suffices that the first and second decompression sections 130 and 132 read the encoded data from the memory 120 in a raster scan direction. Specifically, the read address generation circuit 320 generates the read address of the line buffer section 350 so that encoded data $CD_{L-1}$, $CD_{(L-1)-1}$, . . . , $CD_{1-1}$, $CD_{L-2}$, $CD_{(L-1)-2}$, . . . , $CD_{1-2}$, . . . , $CD_{L-K}$, . . . , and $CD_{1-K}$ is read in that order, and the decompression process is sequentially performed on the encoded data, whereby the image data of the image IMG3 when the rotation angle is 270° can be output.

According to this embodiment, the image data of one screen need not be stored in the work area necessary for the rotation process. When performing the compression process in units of blocks of eight pixels, it suffices to provide a line buffer which stores the image data of at least eight scan lines. When performing the compression process in units of blocks of four pixels, it suffices to provide a line buffer which stores the image data of at least four scan lines.

Note that rotation processing section 150 according to this embodiment is not limited to the processes shown in FIGS. 8A and 8B, FIGS. 9A and 9B, FIGS. 10A and 10B, and FIGS. 11A and 11B.

2.3 Compression Section

Figure 12:
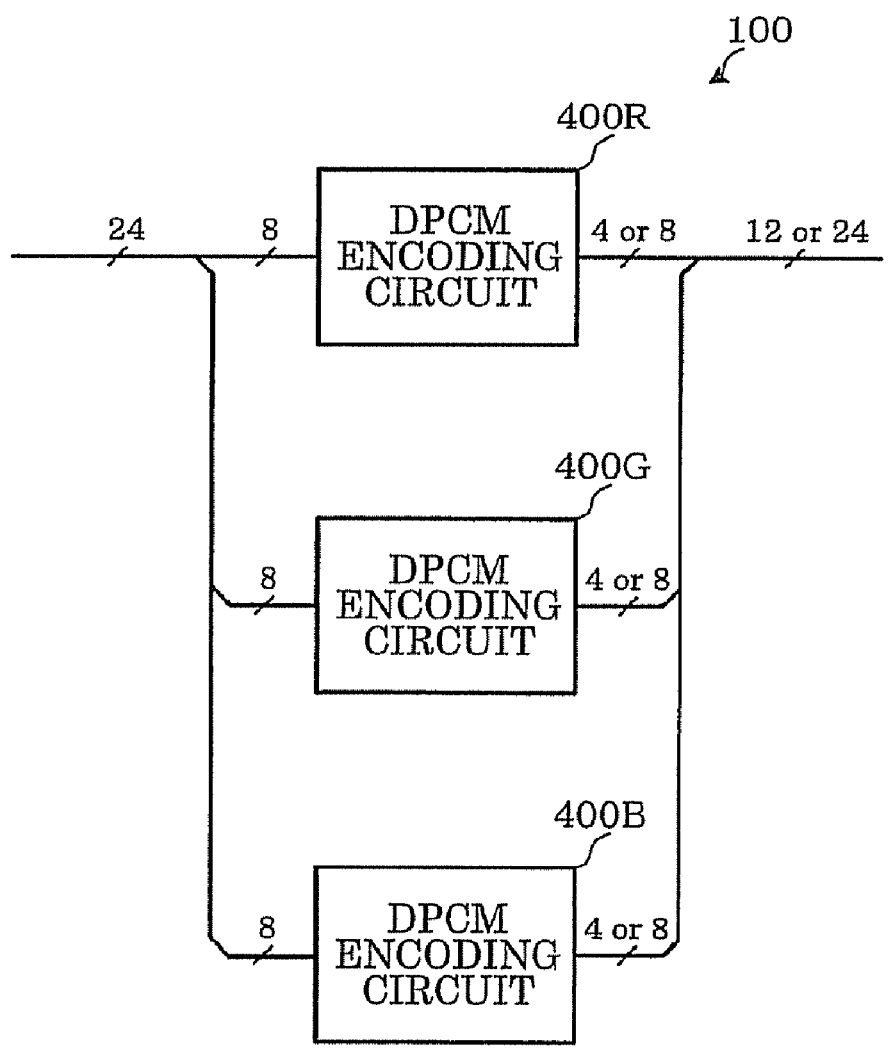
FIG. 12 is a block diagram showing a configuration example of a compression section shown in FIG. 2.

FIG. 12 is a block diagram showing a configuration example of the compression section 100 shown in FIG. 2.

FIG. 12 shows an example in which the format of the image data of the image input from the baseband engine 10 is an RGB888 format. The compression section 100 includes DPCM encoding circuits 400R, 400G, and 400B. The DPCM encoding circuits 400R, 400G, and 400B have the same configuration.

When the format of the image data is an RGB888 format, the image data input through the host I/F 140 and the rotation processing section 150 is 24 bits per pixel. The 8-bit R-component image data is input to the DPCM encoding circuit 400R, the 8-bit G-component image data is input to the DPCM encoding circuit 400G, and the 8-bit B-component image data is input to the DPCM encoding circuit 400B.

Each DPCM encoding circuit outputs the 8-bit image data as 4-bit encoded data for the compression target pixel. The compression section 100 encodes the image data in color component units. Each DPCM encoding circuit outputs the 8-bit image data for the pixel other than the compression target pixel.

Figure 13:
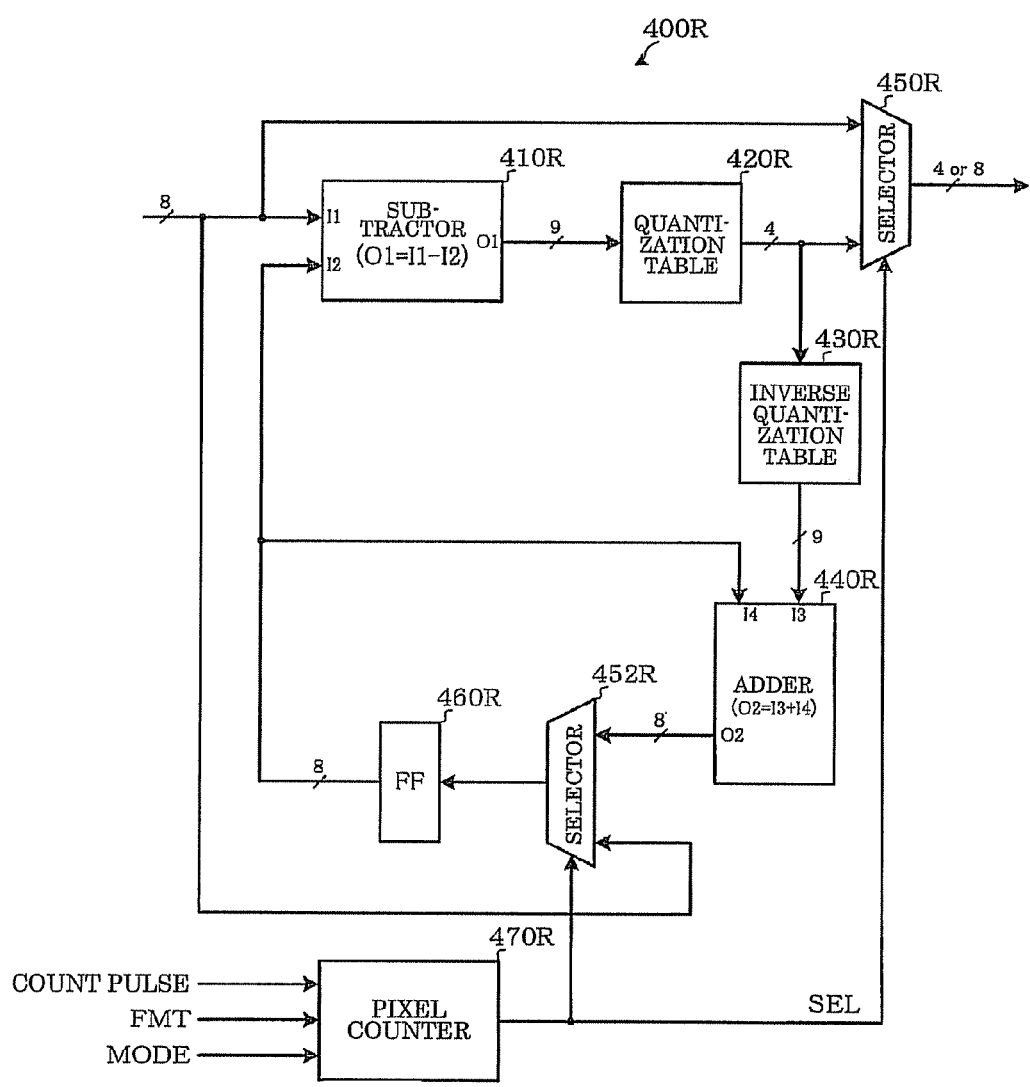
FIG. 13 is a block diagram showing a configuration example of a DPCM encoding circuit shown in FIG. 12.

FIG. 13 is a block diagram showing a configuration example of the DPCM encoding circuit 400R shown in FIG. 12.

The DPCM encoding circuits 400G and 400B have the same configuration as that of the DPCM encoding circuit 400R shown in FIG. 13.

The DPCM encoding circuit 400R includes a subtractor 410R, a quantization table 420R, an inverse quantization table 430R, an adder 440R, selectors 450R and 452R, a flip-flop 460R, and a pixel counter 470R.

The subtractor 410R calculates the difference between the input 8-bit image data and 8-bit image data held by the flip-flop 460R, and outputs 9-bit difference data including a carry bit (borrow bit). The difference data is supplied to the quantization table 420R.

FIG. 14A schematically shows the configuration of the quantization table 420R shown in FIG. 13.

A 4-bit output value corresponding to the 9-bit input value is registered in the quantization table 420R. The output value is a value obtained by quantizing the input value. The output value indicates the quantized value with 4 bits. The quantization table 420R receives the 9-bit difference data from the subtractor 410R as the input value, and outputs the quantized data which is the 4-bit output value. The quantized data is supplied to the inverse quantization table 430R.

FIG. 14B schematically shows the configuration of the inverse quantization table 430R shown in FIG. 13.

The inverse quantization table 430R is table corresponding to the quantization table 420R. A 9-bit output value corresponding to the 4-bit input value is registered in the inverse quantization table 430R. The output value is a value obtained by inverse quantization of the input value. The output value indicates the quantized value with 9 bits. Specifically, the values of the quantization table 420R and the inverse quantization table 430R are registered so that the output value of the inverse quantization table 430R corresponds to the input value of the quantization table 420R.

The inverse quantization table 430R receives the quantized data from the quantization table 420R as the input value, and outputs the inverse-quantized data which is the 9-bit output value.

Again referring to FIG. 13, The quantized data from the quantization table 420R is also input to the selector 450R. The 8-bit image data from the rotation processing section 150 and the 4-bit quantized data are input to the selector 450R. The selector 450R outputs either the 8-bit image data from the rotation processing section 150 or the 4-bit quantized data based on a select control signal SEL generated by the pixel counter 470R. The 4-bit or 8-bit output data from the selector 450R is the encoded data shown in FIG. 4A and is stored in the memory 120.

The inverse-quantized data is input to the adder 440R. The 9-bit inverse-quantized data and the 8-bit image data held by the flip-flop 460R are input to the adder 440R. The adder 440R adds the inverse-quantized data and the image data held by the flip-flop 460R, and supplies 8-bit addition data to the selector 452R.

The 8-bit addition data from the adder 440R and the 8-bit image data input through the host I/F 140 are input to the selector 452R. The selector 452R outputs either the 8-bit addition data from the adder 440R or the 8-bit image data input through the host I/F 140 based on the select control signal SEL generated by the pixel counter 470R. The data selected by the selector 452R is held by the flip-flop 460R. The flip-flop 460R latches the data selected by the selector 452R using a count pulse which is incremented in units of color components of the image data input through the host I/F 140, for example.

The count pulse and the control signals FMT and MODE are input to the pixel counter 470R. When the line mode is designated by the control signal MODE, the pixel counter 470R generates the select control signal SEL so that DPCM encoding is performed in scan line units. In the line mode, only the first pixel of one scan line is output directly, and the difference from the preceding pixel is quantized for the remaining pixels. When the partial mode is designated by the control signal MODE, the pixel counter 470R generates the select control signal SEL at the timing specified by the count pulse corresponding to the image format designated by the control signal FMT.

Figure 15:
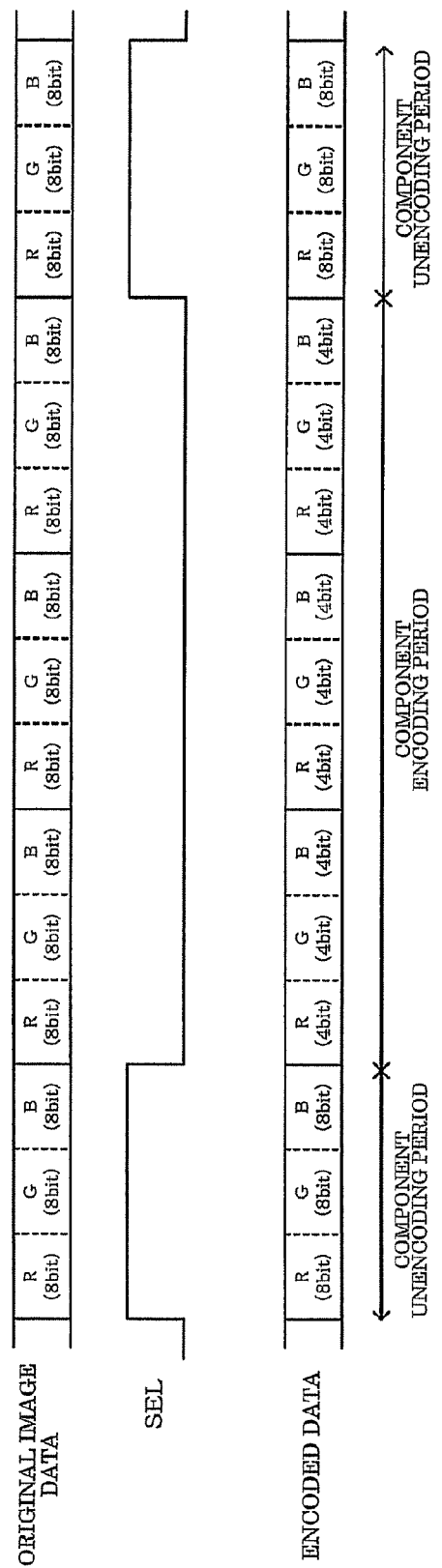
FIG. 15 is a timing diagram showing an operation example of a pixel counter shown in FIG. 13.

FIG. 15 is a timing diagram showing an operation example of the pixel counter 470R shown in FIG. 13.

FIG. 15 shows an operation example of the pixel counter 470R when the partial mode is designated by the control signal MODE.

When an RGB888 format is designated by the control signal FMT, the pixel counter 470R generates the select control signal SEL so that the first pixel is output without being subjected to the compression process. A component unencoding period can be specified by the select control signal SEL. Therefore, the selectors 450R and 452R select and directly output the 8-bit image data input from the outside. As a result, the encoded data output from the compression section 100 can be output as the 8-bit input image data.

The pixel counter 470R generates the select control signal SEL so that the second to fourth pixels subsequent to the first pixel are encoded. A component encoding period can be specified by the select control signal SEL. Therefore, the selector 450R outputs the quantized data, and the selector 452R outputs the addition data. Therefore, the data obtained by quantizing the difference from the adjacent pixel is output as the encoded data (component encoding period).

When the line mode is designated by the control signal MODE, the remaining pixels of the scan line is encoded in the same manner as the second to fourth pixels in the partial mode.

Although FIGS. 12 to 15 illustrate an example of the RGB888 format, the image data in another image format can be similarly encoded by causing the pixel counter 470R to change the timing of the select control signal SEL corresponding to the image format.

The configuration of the compression section 100 is not limited to the configuration described with reference to FIGS. 12 to 15.

2.4 Decompression Section (First Decompression Section and Second Decompression Section)

Figure 16:
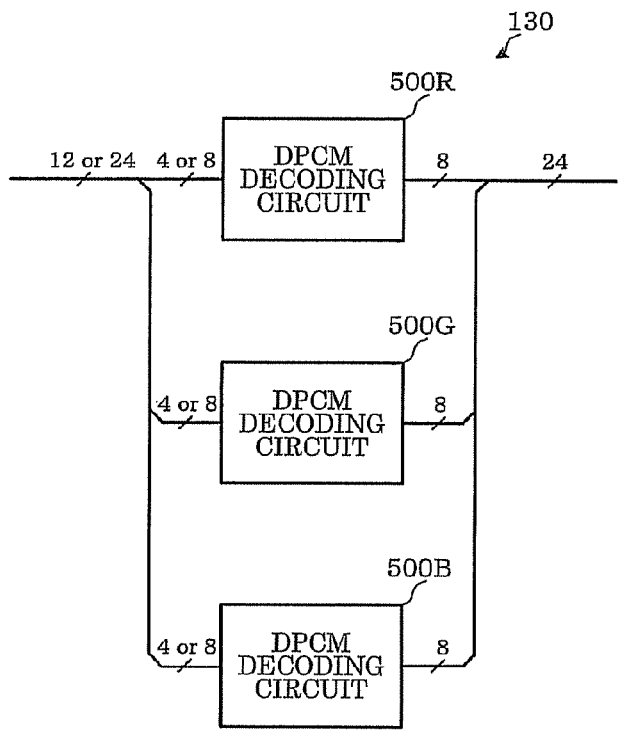
FIG. 16 is a block diagram showing a configuration example of a first decompression section shown in FIG. 2.

FIG. 16 is a block diagram showing a configuration example of the first decompression section 130 shown in FIG. 2.

Note that the second decompression section 132 has the same configuration as that of the first decompression section 130 described with reference to FIG. 16. FIG. 16 shows an example in which the format of the image data is an RGB888 format.

The first decompression section 130 includes DPCM decoding circuits 500R, 500G, and 500B. The DPCM decoding circuits 500R, 500G, and 500B have the same configuration.

The 8-bit image data of the R component of the first pixel is input to the DPCM decoding circuit 500R, and the 4-bit encoded data of the R component of the second to fourth pixels is then sequentially input to the DPCM decoding circuit 500R. The 8-bit image data of the G component of the first pixel is input to the DPCM decoding circuit 500G, and the 4-bit encoded data of the G component of the second to fourth pixels is then sequentially input to the DPCM decoding circuit 500G. The 8-bit image data of the B component of the first pixel is input to the DPCM decoding circuit 500B, and the 4-bit encoded data of the B component of the second to fourth pixels is then sequentially input to the DPCM decoding circuit 500B.

Each DPCM decoding circuit outputs the 4-bit encoded data as the 8-bit image data for the compression target pixel. The first decompression section 130 decodes the image data in color component units. Each DPCM decoding circuit outputs the 8-bit encoded data for the pixel other than the compression target pixel.

Figure 17:
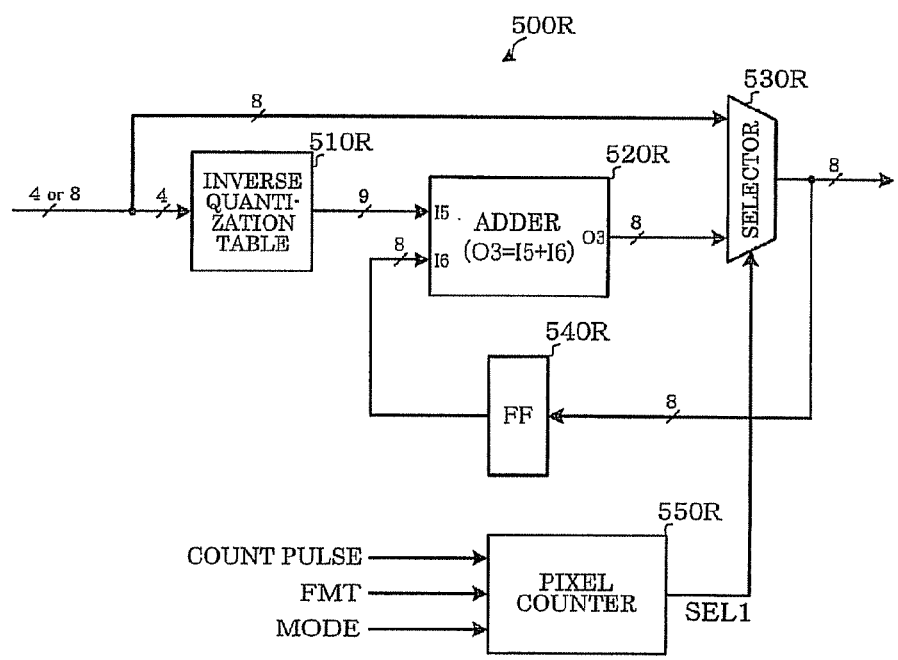
FIG. 17 is a block diagram showing a configuration example of a DPCM decoding circuit shown in FIG. 16.

FIG. 17 is a block diagram showing a configuration example of the DPCM decoding circuit 500R shown in FIG. 16.

Note that the DPCM decoding circuits 500G and 500B have the same configuration as that of the DPCM decoding circuit 500R shown in FIG. 17.

The DPCM decoding circuit 500R includes an inverse quantization table 510R, an adder 520R, a selector 530R, a flip-flop 540R, and a pixel counter 550R.

The inverse quantization table 510R is similar to the inverse quantization table 430R shown in FIG. 13. The inverse quantization table 510R may have the function shown in FIG. 14B. Specifically, the inverse quantization table 510R converts the 4-bit encoded data into 9-bit inverse-quantized data.

The inverse-quantized data from the inverse quantization table 510R and the 8-bit image data held by the flip-flop 540R are input to the adder 540R. The adder 540R adds the inverse-quantized data and the image data held by the flip-flop 540R, and outputs 8-bit addition data. The addition data is input to the selector 530R.

The 8-bit image data which is not compressed and the addition data are input to the selector 530R. The selector 530R outputs either the 8-bit image data or the addition data based on a select control signal SEL1 generated by the pixel counter 550R. The data selected by the selector 530R is held by the flip-flop 540R.

The flip-flop 540R latches the data selected by the selector 530R using a count pulse which is incremented in units of color components of the image data input read from the memory 120.

The count pulse and the control signals FMT and MODE are input to the pixel counter 550R. When the line mode is designated by the control signal MODE, the pixel counter 470R generates the select control signal SEL1 so that DPCM decoding is performed in scan line units. In the line mode, only the first pixel of one scan line is output directly, and the remaining (subsequent) pixels are subjected to DPCM decoding. When the partial mode is designated by the control signal MODE, the pixel counter 550R generates the select control signal SEL1 at the timing specified by the count pulse corresponding to the image format specified by the control signal FMT.

When the line mode is designated and an RGB888 format is designated by the control signal FMT, the pixel counter 550R generates the select control signal SEL1 so that the first pixel is output without being decompressed. Therefore, the selector 530R selects and outputs the image data read from the memory 120. The pixel counter 550R generates the select control signal SEL1 so that the remaining pixels of the scan line subsequent to the first pixel are decoded. Therefore, the selector 530R outputs the addition data. As a result, the first decompression section 130 can output the 8-bit image data subjected to DPCM decoding.

When the partial mode is designated and an RGB888 format is designated by the control signal FMT, the pixel counter 550R generates the select control signal SEL1 so that the first pixel is output without being decompressed. Therefore, the selector 530R selects and outputs the image data read from the memory 120. The pixel counter 550R generates the select control signal SEL1 so that the second to fourth pixels subsequent to the first pixel are decoded. Therefore, the selector 530R outputs the addition data. As a result, the first decompression section 130 can output the 8-bit image data subjected to DPCM decoding.

Although FIGS. 16 and 17 illustrate an example of the RGB888 format, the image data in another image format can be similarly decoded by causing the pixel counter 550R to change the timing of the select control signal SEL1 corresponding to the image format.

The configuration of the first decompression section 130 is not limited to the configuration described with reference to FIGS. 16 and 17.

2.5 Overlay Processing Section

The overlay processing section 170 shown in FIG. 2 includes an overlay processing circuit which perform an overlay process on the image data from the first and second format conversion sections 160 and 162 in units of RGB color components.

Figure 18:
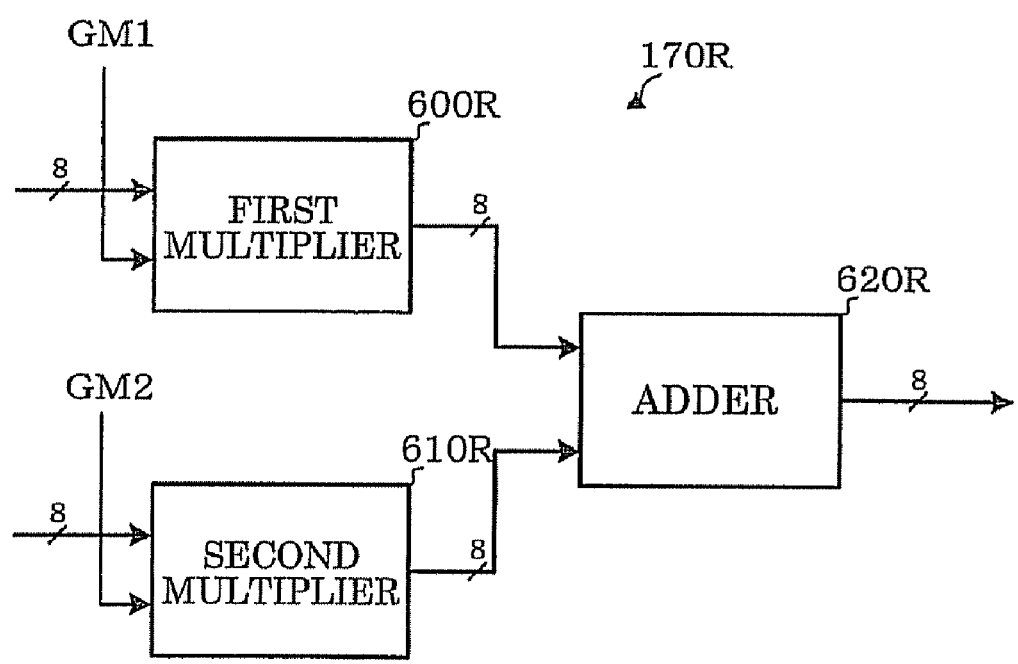
FIG. 18 is a block diagram showing a configuration example of an R-component overlay processing circuit of an overlay processing section shown in FIG. 2.

FIG. 18 is a block diagram showing a configuration example of the R-component overlay processing circuit of the overlay processing section 170 shown in FIG. 2. Note that G-component and B-component overlay processing circuits have the same configuration as that of the R-component overlay processing circuit shown in FIG. 18.

An R-component overlay processing circuit 170R of the overlay processing section 170 includes first and second multipliers 600R and 610R and an adder 620R.

The control signal GM1 and the image data subjected to format conversion by the first format conversion section 160 are input to the first multiplier 600R. For example, the first multiplier 600R multiplies the image data by a transmittance designated by the control signal GM1 in color component units, and outputs the multiplied data to the adder 620R.

The control signal GM2 and the image data subjected to format conversion by the second format conversion section 160 are input to the second multiplier 610R. For example, the second multiplier 610R multiplies the image data by a transmittance designated by the control signal GM2 in color component units, and outputs the multiplied data to the adder 620R.

The adder 620R adds the multiplied data from the first multiplier 600R and the multiplied data from the second multiplier 610R in color component units, and outputs the resulting data as overlaid data.

When the multiplied data from the first multiplier 600R is referred to as MD1, the multiplied data from the second multiplier 610R is referred to as MD2, the transmittance designated by the control signal GM1 is referred to as g1, and the transmittance designated by the control signal GM2 is referred to as g2, output data OD from the adder 620R is expressed by the following equation.

$$OD(R) = MD1(R) \times g1 + MD2(R) \times g2 \qquad (1)$$

(R) indicates that that data is R-component data. The overlaid data is supplied to the display driver 40 through the driver I/F 180. The G-component output data OD(G) and the B-component output data OD(B) are similarly expressed by the equation (1).

3. Electronic Instrument

Figure 19:
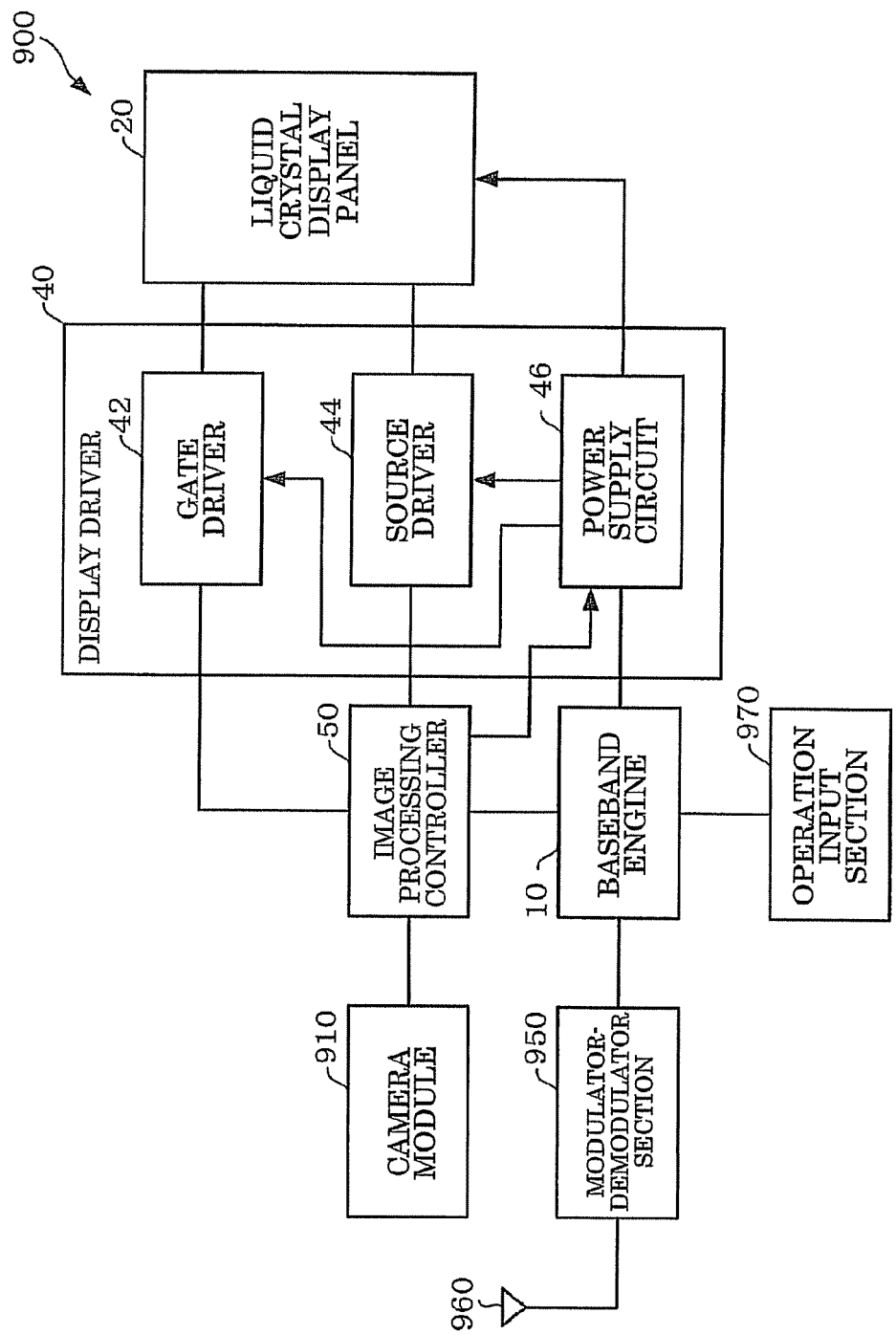
FIG. 19 is a block diagram showing a configuration example of an electronic instrument according to one embodiment of the invention.

FIG. 19 is a block diagram showing a configuration example of a portable telephone as an electronic instrument according to one embodiment of the invention. In FIG. 19, the same sections as in FIG. 1 are indicated by the same symbols. Description of these sections is appropriately omitted.

A portable telephone 900 includes a camera module 910. The camera module 910 includes a CCD camera, and supplies data of an image captured using the CCD camera to the image processing controller 50 (image processing device) in a YUV format, for example.

The portable telephone 900 includes the liquid crystal display panel 20. The liquid crystal display panel 20 is driven by the display driver 40 (driver section). The liquid crystal display panel 20 includes a plurality of gate lines, a plurality of source lines, and a plurality of pixels.

The display driver 40 includes a gate driver 42, a source driver 44, and a power supply circuit 46. The gate driver 42 scans the gate lines of the liquid crystal display panel 20. The source driver 44 drives the source lines of the liquid crystal display panel 20 based on image data. The power supply circuit 46 generates voltages supplied to the gate driver 42, the source driver 44, and the liquid crystal display panel 20. The power supply circuit 46 is connected to the source driver 44 and the gate driver 42, and supplies drive power supply voltages to the source driver 44 and the gate driver 42. The power supply circuit 46 supplies a common electrode voltage Vcom to a common electrode of the liquid crystal display panel 20.

The image processing controller 50 is connected to the display driver 40, and supplies image data in an RGB format to the source driver 44.

The baseband engine 10 is connected to the image processing controller 50. The baseband engine 10 controls the image processing controller 50. The baseband engine 10 demodulates image data received via an antenna 960 using a modulator-demodulator section 950, and supplies the demodulated image data to the image processing controller 50. The image processing controller 50 causes the source driver 44 and the gate driver 42 to display an image on the liquid crystal display panel 20 based on the image data.

The baseband engine 10 modulates the image data generated by the camera module 910 using the modulator-demodulator section 950, and directs transmission of the modulated data to another communication device via the antenna 960.

The baseband engine 10 transmits and receives image data, captures an image using the camera module 910, and displays an image on the liquid crystal display panel 20 based on operation information from an operation input section 970.

The invention is not limited to the above embodiments. Various modifications and variations may be made within the spirit and scope of the invention. For example, the invention may be applied not only to drive the liquid crystal display panel, but also to drive an electroluminescent display device, a plasma display device, and the like.

Some of the requirements of any claim of the invention may be omitted from a dependent claim which depends on that claim. Some of the requirements of any independent claim of the invention may be allowed to depend on any other independent claim.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. An image processing device that supplies image data to a driver section of a display panel, the image processing device comprising:
   an encoding section that encodes image data on a block-by-block basis to generate encoded data, the image data corresponding to one scan line of an input image, the image data being divided into a plurality of blocks;
   a memory that stores the encoded data from the encoding section;
   a decoding section that decodes the encoded data from the memory on a block-by-block basis to generate decoded data, the decoded data from the decoding section being supplied to the driver section; and
   a rotation processing section that performs a rotation process, the rotation process generating an image by rotating the input image by a given angle with respect to a vertical direction of the input image,
   the rotation processing section including one or a plurality of line buffers,
   a number of pixels of one block among the plurality of blocks being I,
   each line buffer of the one or the plurality of line buffers storing image data of at least I scan lines, the image data of one screen being not stored in each line buffer,
   I pixel units of the image data being read from each line buffer and the encoding section performing an encoding process in I pixel units of the image data, the one block being configured by the I pixel units,
   the one block being one-pixel-line block which is not a square block,
   the one-pixel-line block being read from each line buffer in a direction corresponding to a rotation angle of the rotation process to generate the encoded data that is obtained by encoding the one-pixel-line block,
   the encoded data being stored in the memory in a given order corresponding to the rotation angle, and
   when a capacity of each line buffer is LB bits, the number of pixels of one scan line of the input image is H, and the number of bits of one pixel of the input image is P, a data length of the one block being a value equal to or less than f(LB/H/P), the function f indicating a function omitting a decimal point and a decimal place.

2. The image processing device as defined in claim 1, further comprising:
   a read address generation circuit that generates a read address that specifies a read area of the memory,
   a part of the encoded data corresponding to the one block among the plurality of blocks being read from the read area specified by the read address.

3. The image processing device as defined in claim 1, when the encoding section encodes the image data of the input image at a compression rate equal to or higher than a given compression rate W, a bit width that is an access unit of the memory is B, and the number of bits of one pixel of the input image is P, a data length of the one block being a value equal to or less than f(B/W/P), the function f indicating a function omitting a decimal point and a decimal place.

4. The image processing device as defined in claim 1, a data length of the one block being caused to differ depending on a format of the image data of the input image.

5. An image processing method that supplies image data to a driver section of a display panel, the image processing method comprising:
   encoding image data on a block-by-block basis to generate encoded data, the image data corresponding to one scan line of an input image, the image data being divided into a plurality of blocks;
   storing the encoded data in a memory;
   decoding the encoded data from the memory on a block-by-block basis to generate decoded data;
   supplying the decoded data to the driver section; and
   performing a rotation process using one or a plurality of line buffers, the rotation process generating an image by rotating the input image by a given angle with respect to a vertical direction of the input image,
   a number of pixels of one block among the plurality of blocks being I,
   each line buffer of the one or the plurality of line buffers storing image data of at least I scan lines, the image data of one screen being not stored in each line buffer,
   I pixel units of the image data being read from each line buffer and being encoded, the one block being configured by the I pixel units,
   the one block being one-pixel-line block which is not a square block,
   the one-pixel-line block being read from each line buffer in a direction corresponding to a rotation angle of the rotation process to generate the encoded data that is obtained by encoding the one-pixel-line block, the encoded data being stored in the memory in a given order corresponding to the rotation angle, and when a capacity of each line buffer is LB bits, the number of pixels of one scan line of the input image is H, and the number of bits of one pixel of the input image is P, a data length of the one block being a value equal to or less than f(LB/H/P), the function f indicating a function omitting a decimal point and a decimal place.

6. The image processing method as defined in claim 5, further comprising:

generating a write address that specifies a write area of the memory; and updating data in the write area specified by the write address by a part of the encoded data corresponding to the one block among the plurality of blocks.

7. The image processing method as defined in claim 5, further comprising:

generating a read address that specifies a read area of the memory; and reading a part of the encoded data corresponding to the one block among the plurality of blocks from the read area specified by the read address.

8. The image processing method as defined in claim 5, when the encoding section encodes the image data of the input image at a compression rate equal to or higher than a given compression rate W, a bit width that is an access unit of the memory is B, and the number of bits of one pixel of the input image is P, a data length of the one block being a value equal to or less than f(B/W/P), the function f indicating a function omitting a decimal point and a decimal place.

9. The image processing method as defined in claim 5, further comprising:

causing a data length of the one block to differ depending on a format of the image data of the input image.

10. The image processing method as defined in claim 5, further comprising:

reading the image data of I pixel units arranged in a first direction corresponding to a horizontal scan direction from each line buffer and encoding read data when rotation angle of the rotation process is 0°; and reading the image data of I pixel units arranged in a second direction corresponding to a vertical scan direction from each line buffer and encoding read data when the rotation angle of the rotation process is 90°.

11. The image processing method as defined in claim 10, further comprising:

reading the encoded data from the memory in a raster scan direction and decoding read data when the rotation angle of the rotation process is 0° and also when the rotation angle of the rotation process is 90°.

12. An electronic instrument comprising:

the image processing device as defined in claim 1;

a driver section, image data being supplied to the driver section from the image processing device; and a display panel that is driven by the driver section.

13. An electronic instrument comprising:

the image processing device as defined in claim 1;

a driver section, image data being supplied to the driver section from the image processing device; and a display panel that is driven by the driver section.

14. An electronic instrument comprising:

the image processing device as defined in claim 3;

a driver section, image data being supplied to the driver section from the image processing device; and a display panel that is driven by the driver section.

15. The image processing device as defined in claim 1, the image data of I pixel units arranged in a first direction corresponding to a horizontal scan direction being read from each line buffer and being encoded by the encoding section when rotation angle of the rotation process is 0°, the image data of I pixel units arranged in a second direction corresponding to a vertical scan direction being read from each line buffer and being encoded by the encoding section when the rotation angle of the rotation process is 90°.

16. The image processing device as defined in claim 15, the decoding section reading the encoded data from the memory in a raster scan direction when the rotation angle of the rotation process is 0° and also when the rotation angle of the rotation process is 90°.

* * * * *